US010855827B2

(12) United States Patent
Houtchens et al.

(10) Patent No.: US 10,855,827 B2
(45) Date of Patent: *Dec. 1, 2020

(54) SPEAKERPHONE CONFIGURATION FOR CONFERENCING

(71) Applicant: Google LLC, Mountain View, CA (US)

(72) Inventors: Steven Houtchens, Los Altos, CA (US); Göran Hauer, Umeå (SE); Johanna Liljedahl, Umeå (SE); Daniel Bodin, Stockholm (SE)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/437,616

(22) Filed: Jun. 11, 2019

(65) Prior Publication Data

US 2020/0021677 A1 Jan. 16, 2020

Related U.S. Application Data

(63) Continuation of application No. 15/813,721, filed on Nov. 15, 2017, now Pat. No. 10,367,930, which is a
(Continued)

(51) Int. Cl.
*H04M 1/62* (2006.01)
*H04M 1/60* (2006.01)
*H04M 1/247* (2006.01)

(52) U.S. Cl.
CPC ........... *H04M 1/62* (2013.01); *H04M 1/6033* (2013.01); *H04M 1/2476* (2013.01)

(58) Field of Classification Search
CPC ..... H04M 1/62; H04M 1/6033; H04M 1/2476
See application file for complete search history.

(56) References Cited

U.S. PATENT DOCUMENTS

| 4,620,317 A | 10/1986 | Anderson |
| 5,041,009 A | 8/1991 | McCleerey |

(Continued)

FOREIGN PATENT DOCUMENTS

| CN | 101626529 A | 1/2010 |
| CN | 202617347 U | 12/2012 |

(Continued)

OTHER PUBLICATIONS

Cisco Systems, "Cisco Unified IP Conference Station 7936", Phone Guide, downloaded Mar. 4, 2016.
(Continued)

*Primary Examiner* — Tuan D Nguyen
(74) *Attorney, Agent, or Firm* — Brake Hughes Bellermann LLP

(57) ABSTRACT

Aspects of the present disclosure relate to a speakerphone configuration for audio and/or video conferencing that includes a cavity underneath the speakerphone where cable ports are arranged. The arrangement of the cable ports are such that when a power plug is installed in the speakerphone, a telecommunication port is blocked, and vice versa. In addition, the port arrangement allows cables to attach to opposite walls in the cavity such that cables run parallel to each other within the cavity. The disclosed speakerphone may be daisy-chained together and function as a single unit. Therefore a speakerphone according to the disclosure may function as either a master unit, a mid unit, or an end unit in a string of speakerphones depending on how the speakerphone is wired. The port arrangement in the cavity increases ease for setup and daisy-chaining of multiple speakerphone units.

18 Claims, 21 Drawing Sheets

Related U.S. Application Data continuation of application No. 15/370,148, filed on Dec. 6, 2016, now Pat. No. 9,854,080.

(60) Provisional application No. 62/320,153, filed on Apr. 8, 2016.

(56) References Cited

U.S. PATENT DOCUMENTS

| | | | |
|---|---|---|---|
| 5,226,076 | A | 7/1993 | Baumhauer et al. |
| 5,329,620 | A | 7/1994 | Alford et al. |
| 5,369,701 | A * | 11/1994 | McAteer ............... H04M 1/62 |
| | | | 379/420.02 |
| 5,561,737 | A * | 10/1996 | Bowen ................... H04M 3/56 |
| | | | 704/275 |
| 6,016,346 | A | 1/2000 | Rittmueller et al. |
| 6,104,807 | A | 8/2000 | Johnson et al. |
| 9,479,627 | B1 * | 10/2016 | Rung ..................... H04M 1/035 |
| 2005/0037782 | A1 * | 2/2005 | Diethorn ............. H04M 1/6033 |
| | | | 455/462 |
| 2005/0105740 | A1 * | 5/2005 | Dyer ................... B60R 11/0241 |
| | | | 381/16 |
| 2005/0231586 | A1 | 10/2005 | Rodman et al. |
| 2005/0286698 | A1 | 12/2005 | Bathurst et al. |
| 2006/0132595 | A1 | 6/2006 | Kenoyer et al. |
| 2006/0285680 | A1 | 12/2006 | Rodman et al. |
| 2007/0263845 | A1 | 11/2007 | Hodges et al. |
| 2008/0278894 | A1 | 11/2008 | Chen et al. |
| 2009/0252316 | A1 | 10/2009 | Ratmanski et al. |
| 2009/0290745 | A1 | 11/2009 | Weir et al. |
| 2010/0318203 | A1 | 12/2010 | Brooks |
| 2016/0119459 | A1 | 4/2016 | Clementson et al. |
| 2016/0224064 | A1 | 8/2016 | Fleisig |
| 2016/0224084 | A1 * | 8/2016 | Jimbo ..................... G07G 5/00 |

FOREIGN PATENT DOCUMENTS

| | | |
|---|---|---|
| CN | 206743545 U | 12/2017 |
| JP | 2013062773 A | 4/2013 |
| KR | 901626529 A | 1/2010 |
| WO | 2010024971 A1 | 3/2010 |

OTHER PUBLICATIONS

Cisco, "Cisco Unified IP Conference Phone 8831", Data Sheet, downloaded Mar. 4, 2016.

Cisco, "Features of Your Cisco Unified IP Conference Phone", Cisco Unified IP Conference Phone 8831 User Guide on Cisco Unified Communications Manager 9.0, downloaded Mar. 4, 2016.

Combined Search and Examination Report for United Kingdom Patent Application No. GB1621996.6, dated May 10, 2017, 7 pages.

International Search Report and Written Opinion for PCT Application No. PCT/US2016/065850, dated Mar. 15, 2017.

International Preliminary Report on Patentability for International Application No. PCT/US2016/065850, dated Oct. 18, 2018, 8 pages.

Jabra, "Jabra Speak 810", User Manual, downloaded Apr. 6, 2016.

Notice of Grant for Chinese Patent Application No. 201611227716.0, dated Aug. 23, 2018.

Notification of First Office Action dated Mar. 22, 2018, for Chinese Patent Application No. 201611227716.0, 11 pages.

Office Action for German Application No. 102016124499.1, daeted Nov. 29, 2018, 10 pages.

Phoenix Audio Technologies, "Quattro 3 Conference Speakerphone", Model 302, User Manual, Downloaded Mar. 4, 2016.

Phoenix Audio Technologies, "Spider MT503 Smart", User Manual, downloaded Apr. 6, 2016.

Polycom, Inc., Polycom Soundstaton IP 7000 Phone Setup Guide, Apr. 1, 2015.

Revolabs, "revolabs FLX UC 1500, Enterprise VoIP and Soflphone Conferencing, Extended", datasheet, Jun. 1, 2015.

Revolabs, "revolabs FLX UC 500, USB Conference Phone for the Enterprise", datasheet, Sep. 21, 2015.

Yamaha, "YVC-1000 Unified Communications Microphone & Speaker System", Use~s Manual, Sep. 2015.

* cited by examiner

100

100

500

320

320

700

1400A

1400B

1500A

1500B

1700A

1700B

1700C

1800A

1800B

1800C

1900

2000

2100A

2100B

SPEAKERPHONE CONFIGURATION FOR CONFERENCING

CROSS-REFERENCE TO RELATED APPLICATIONS

This application is a continuation of, and claims priority to, U.S. patent application Ser. No. 15/813,721, filed on Nov. 15, 2017, entitled "SPEAKERPHONE CONFIGURATION FOR CONFERENCING", which is a continuation of U.S. patent application Ser. No. 15/370,148, filed on Dec. 6, 2016, entitled "SPEAKERPHONE CONFIGURATION FOR CONFERENCING", now U.S. Pat. No. 9,854,080, which claims priority to U.S. Provisional Patent Application No. 62/320,153, filed on Apr. 8, 2016, entitled "SPEAKERPHONE CONFIGURATION FOR CONFERENCING", the disclosures of which are incorporated by reference herein in their entireties.

BACKGROUND

Speakerphones are used in conference rooms to place and receive calls in a group setting. Depending on room size, multiple speakerphones may be used in a room. Traditional setups may involve installing multiple speakers and microphones throughout the room and cabling each to a central sound mixer.

SUMMARY

Aspects of the disclosure provide for a device. The device includes a speaker, a microphone, and a housing at least partly enclosing the speaker and the microphone. The housing includes a top face including a plurality of input buttons, at least one side wall including one or more lights, and a bottom face opposite the top face, the bottom face. The bottom face includes a cavity, which comprises a well. The well has a first wall having a first port; a second wall adjacent to the first wall, the second wall having a second port; a third wall adjacent to the second wall and parallel to the first wall; and a fourth wall adjacent to the first wall and the third wall and parallel to the second wall. The first port is inaccessible when a first cable is connected to the second port, and the second port is inaccessible when a second cable is connected to the first port.

In one example, the cavity also includes at least two channels, a first channel running between a first side wall and the well, and a second channel running between a second side wall and the well. In this example, the well has a first depth selected to receive a plug of the first or second cable, and the at least two channels each have a second depth selected to receive the first or second cable therethrough. In another example, the first port is configured to connect to a second speakerphone of the plurality of speakerphones, the second port is configured to connect to a power source, and the third port is configured to connect to a third speakerphone of the plurality of speakerphones.

In yet another example, the first port is an RJ45 port and the second port is a barrel power port. In this example, the RJ45 port is a first RJ45 port, and the third wall has a third port that is a second RJ45 port. In addition, the first wall has a fourth port that is a micro-USB port. Also in this example, the fourth wall has a cable guide for a micro-USB cable.

Other aspects of the disclosure provide for an assembly. The assembly includes a plurality of speakerphones, each speakerphone having a housing. The housing of each speakerphone includes a top face including a plurality of input buttons, at least one side wall including one or more lights, and a bottom face including a cavity. The cavity comprises a well, which has a first wall having a first port; a second wall adjacent to the first wall, the second wall having a second port; a third wall adjacent to the second wall and parallel to the first wall, the third wall having a third port; and a fourth wall adjacent to the first wall and the third wall and parallel to the second wall. The first port is inaccessible when a first cable is connected to the second port, and the second port is inaccessible when a second cable is connected to the first port. A pair of speakerphones in the plurality of speakerphones is configured to connect via a cable installed in a first port of a first speakerphone and a third port of a second speakerphone.

In one example, the first port is configured to connect to a second speakerphone of the plurality of speakerphones, the second port is configured to connect to a power source, and the third port is configured to connect to a third speakerphone of the plurality of speakerphones. In this example, the first port is a first RJ45 port, the second port is a barrel power port, and the third port is a second RJ45 port. In addition, the first wall further includes a fourth port that is a micro-USB port. Also in this example, the fourth wall has a cable guide for a micro-USB cable.

In another example, the cavity further comprises at least two channels, a first channel running between a first side wall and the well, and a second channel running between a second side wall and the well. In this example, the well has a first depth selected to receive a plug of the first or second cable, and the at least two channels each have a second depth selected to receive the first or second cable therethrough.

In yet another example, a first speakerphone of the plurality of speakerphones is operational when connected to a second speakerphone of the plurality of speakerphones via the first port of the first speakerphone, a power source via the second port of the first speakerphone, and an audio source via a fourth port of the first speakerphone. In this example, the second speakerphone is operational when connected to the first speakerphone via the third port of the second speakerphone and to a third speakerphone via the first port of the second speakerphone.

Further aspects of the disclosure provide for a kit. The kit includes a plurality of speakerphones, each speakerphone having a housing that includes a top face including a plurality of input buttons; at least one side wall including one or more lights; and a bottom face including a cavity. The cavity comprises a well that has a first wall having a first port; a second wall adjacent to the first wall, the second wall having a second port; a third wall adjacent to the second wall and parallel to the first wall, the third wall having a third port; and a fourth wall adjacent to the first wall and the third wall and parallel to the second wall. The first port is inaccessible when a first cable is connected to the second port, and the second port is inaccessible when a second cable is connected to the first port. A pair of speakerphones in the plurality of speakerphones is configured to connect via a cable installed in a first port of a first speakerphone and a third port of a second speakerphone.

In one example, the first port is configured to connect to a second speakerphone of the plurality of speakerphones, the second port is configured to connect to a power source, and the third port is configured to connect to a third speakerphone of the plurality of speakerphones. In this example, the first port is a first RJ45 port, the second port is a barrel power port, and the third port is a second RJ45 port.

DETAILED DESCRIPTION OVERVIEW

Figure 1:
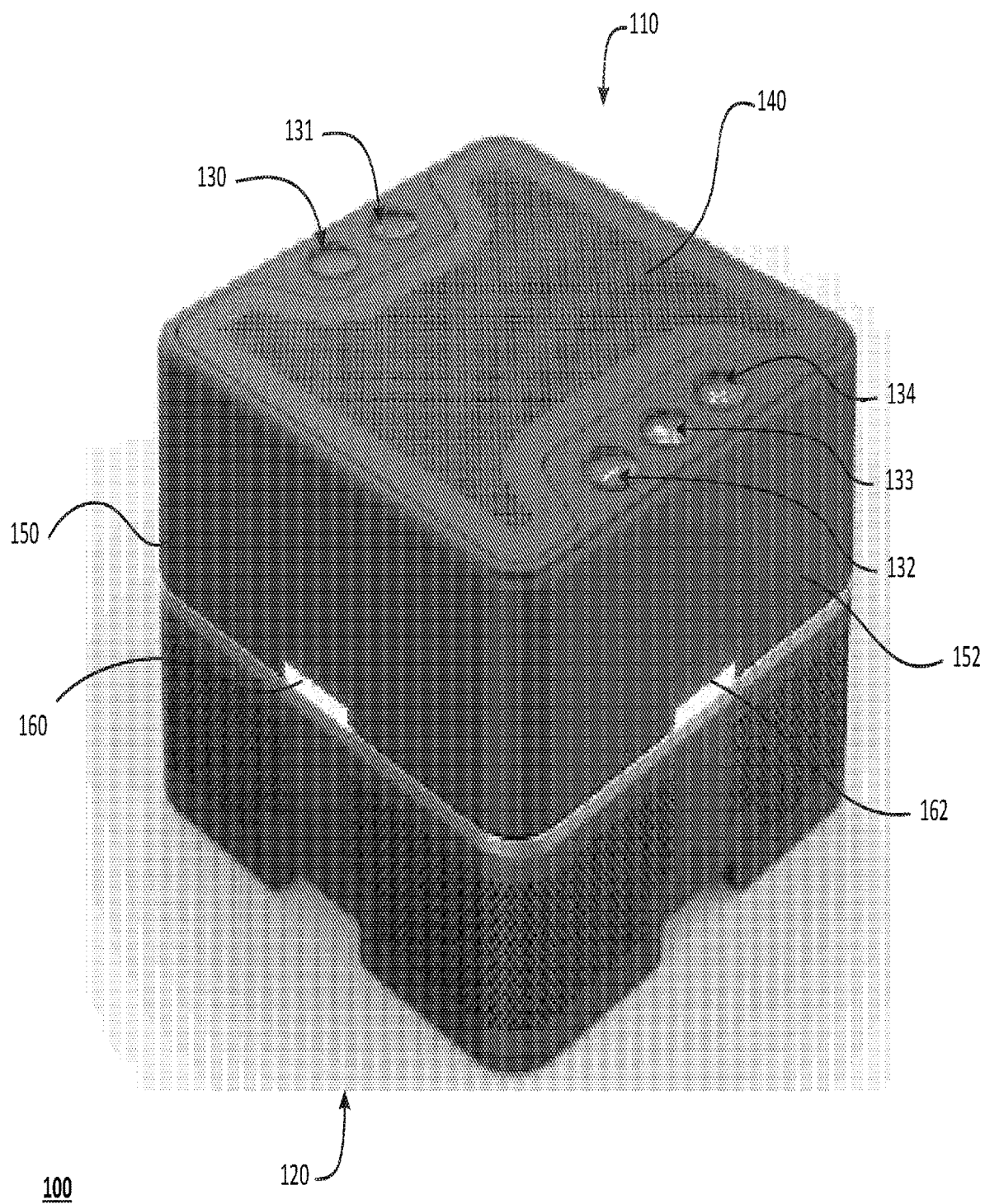
FIG. 1 is a perspective view of a speakerphone in accordance with an aspect of the present disclosure.

The technology relates to a configuration of conference speakerphones that increases ease for setup and tethering of multiple speakerphone units. The speakerphones have both audio output and audio input capabilities. Each speakerphone may have a top face where buttons (or sensors) are for user touch input, at least one side wall, and a bottom face where a cavity is configured to receive all the cable attachments for speakerphone operation. The cavity may be configured to allow a plurality of cable attachment options while preventing incorrect cable attachments.

The cavity may be configured to receive at least one cable connector at or proximate to an inner wall opposite the wall where the cable connector enters the cavity. The inner wall may include ports (or jacks) for a combination of communication plugs and/or power plugs. Ports may be positioned in the cavity such that cable connectors may attach to opposite sides such that the cables run parallel to each other in the cavity. In addition, a port may be positioned such that installation of a cable in a different port blocks access to the port. The cavity may also include guides for at least one cable.

In operation, more than one conference speakerphone may be connected and used for conducting a given call. A plurality of speakerphones may be daisy-chained together, including a master unit, an end unit, and any number of mid units connected between the master unit and the end unit. The cavity of each speakerphone includes all ports needed for operation as any of a master unit, an end unit, or a mid unit.

When more than one conference speakerphone are tethered together, a processor in each of the speakerphones may determine whether a given speakerphone is a master unit, mid unit, or an end unit based on detecting which cables are connected to the speakerphone. The processor may then follow instructions stored in the memory of the speakerphone to operate the speakerphone as the determined unit.

In addition, as discussed in detail below, the features described herein allow for various alternatives.

Example Systems

A speakerphone may comprise a top face, a bottom face, and a plurality of side walls. The top face of the speakerphone may include a speaker grill and a plurality of buttons. The buttons may be concave and surrounded by a raised edge so a user may be able to locate the buttons easily by touch. Furthermore, a raised dot may be located near the button to also aid in locating the buttons by touch. The buttons may be arranged in two sets, a first set on a first half of the top face and a second set on the second half of the top face. The number of buttons in the first set may be different from the number of buttons in the second set so that a user may determine the orientation of the speakerphone and the buttons based on touch. For example, there may be five buttons—e.g., pick up call, hang up, volume up, volume down, and mute. In one scenario, the pick up call and hang up buttons may be the first set that is arranged along a first edge of the top face. In this case, the volume up, volume down, and mute buttons may be the second set of buttons that is arranged along a second edge of the top face opposite the first edge.

The at least one side wall may include lights, such as LEDs, that can illuminate in different colors such as green, red and yellow to indicate status of the device; for example, on, off, and mute. In addition, metal mesh may also be included on the at least one side wall.

Overall, using the above disclosed configuration, the speakerphone may be compact and aesthetically pleasing. For example, the speakerphone may be a rectangular prism having a 120 mm×120 mm top face, a 120 mm×120 mm bottom face, and a 68 mm high side wall. When installed, all of the cabling connections will be tucked neatly underneath the speakerphone to hide them from view, minimize cable tangles and loose connections, etc. The surface of the speakerphone may be customized by color, material, and/or logo, as well as other style and design choices.

As shown in FIG. 1, speakerphone 100 includes top face 110, which comprises five buttons 130, 131, 132, 133, 134. On one side are the pick up call 130 and hang up 131 buttons. On the other side are the volume down 132, mute 133, and volume up 134 buttons. The top face 110 also has the speaker grill 140 between the two sets of buttons. Also, two side walls 150, 152 are shown with the LED lights 160, 162 at the center of each wall with metal mesh covering the lower half of each side wall. The LEDs may illuminate in different colors to indicate a current operational status of the speakerphone.

Figure 2A:
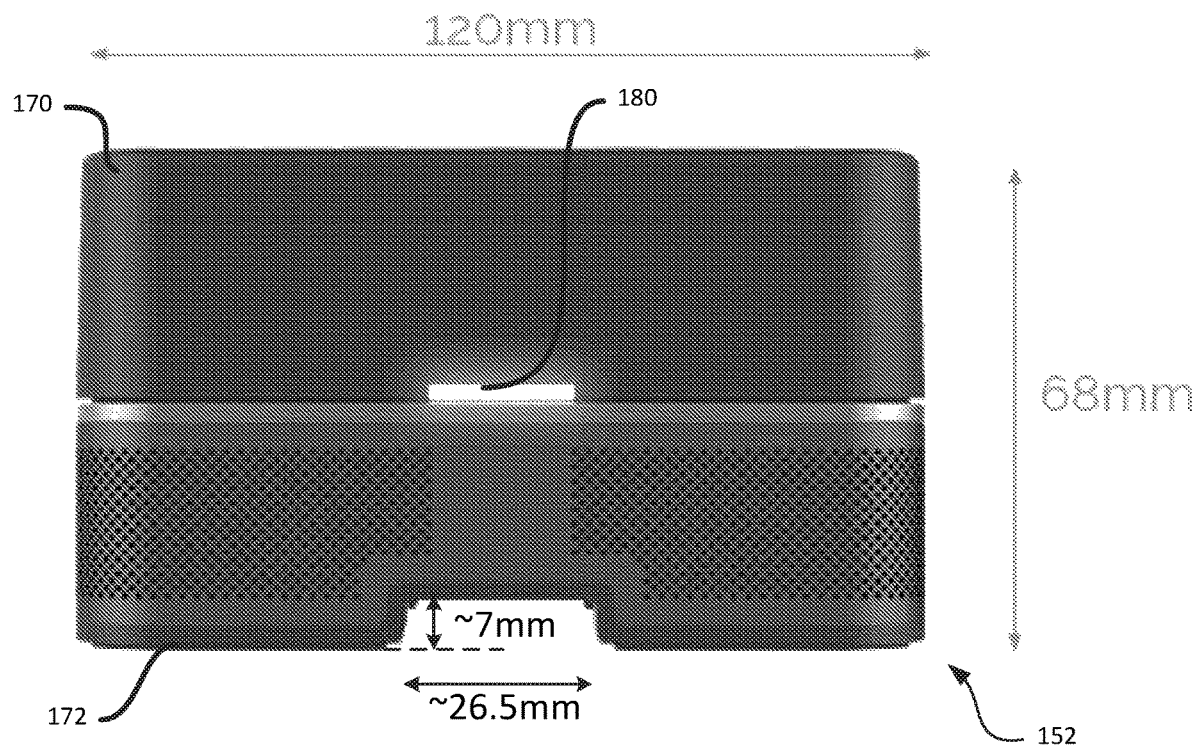
FIG. 2A shows a view of a side wall in accordance with aspects of the present disclosure.

In FIG. 2A, side wall 152 is shown with a solid upper half 170 and a metal mesh bottom half 172. An LED light 180 is shown at the center of the side wall 152, and a cutout for a channel to the cavity is shown at the bottom of the side wall 152. In this example, the dimensions of the side wall are 120 mm wide and 68 mm high. The cutout for the channel is trapezoidal in shape, having sides that angle slightly outward toward the bottom face of the speakerphone. Here, the average width of the cutout is on the order of about 26.5 mm, plus or minus 15%. The height of the cutout is large enough for the installed cables to fit, such that the bottom face of the speakerphone may be placed on a surface and be in full contact with the surface without pressing on a cable installed in the cavity. In this example, the height of the cutout is on the order about 7 mm, plus or minus 15%. The cutout therefore forms a channel to the cavity that is about 26.5 mm wide and 7 mm deep. The cutout may be positioned directly below and centered with the LED light. The LED light may have a slightly smaller width than the cutout; for instance, 25 mm. As noted above, the particular dimensions discussed herein are merely exemplary, and may be larger or smaller, for instance to accommodate diameters of different sizes of USB, RJ45 and/or power cables.

Figure 2B:
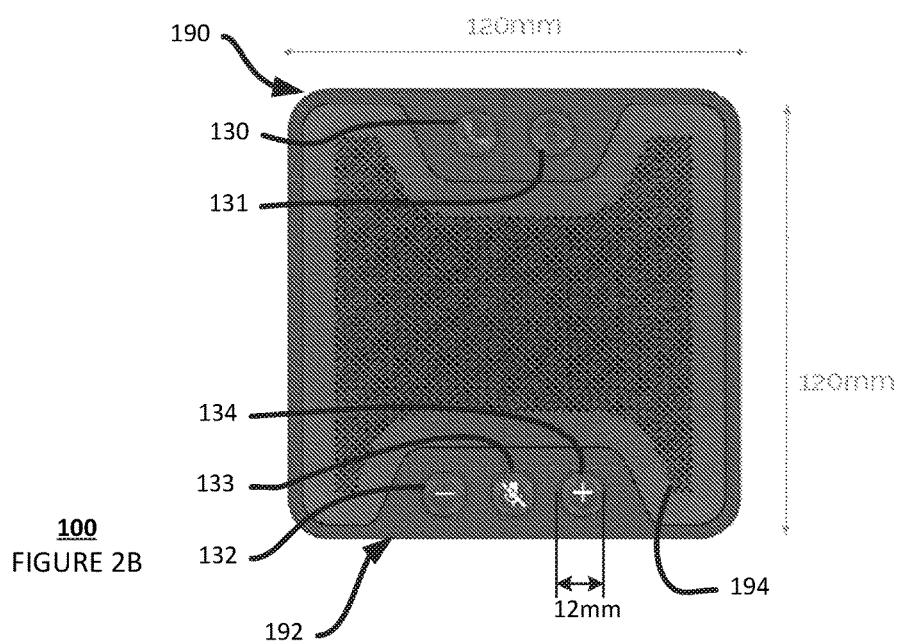
FIG. 2B shows a view of a top face in accordance with aspects of the present disclosure.
Figure 12:
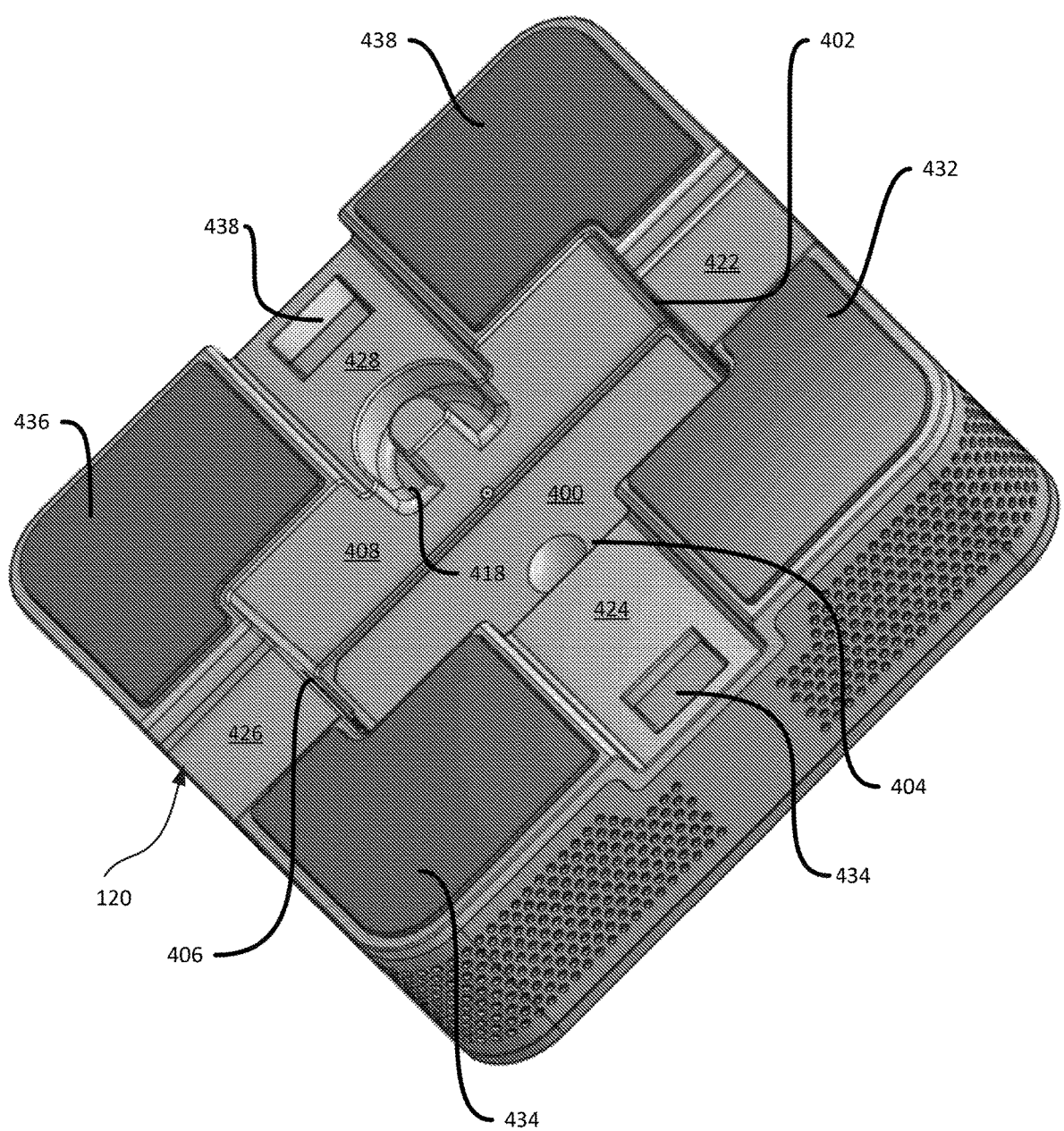

In FIG. 2B, top face 110 is shown with pick up call 130 and hang up 131 buttons along a first edge 190, and volume down 132, mute 133, and volume up 134 buttons along a second edge 192. The buttons may all be the same shape and size, such as a circle with a 12 mm diameter as shown in FIG. 12B. The majority of the top face 110 between the first edge 190 and the second edge 192 is covered by a speaker grill 194. The speaker grill may have trapezoidal cutouts along a first edge and a second edge, such that the speaker grill partially encloses or otherwise goes around the buttons located on the first edge 190 and the second edge 192 of the top face when installed.

Figure 3:
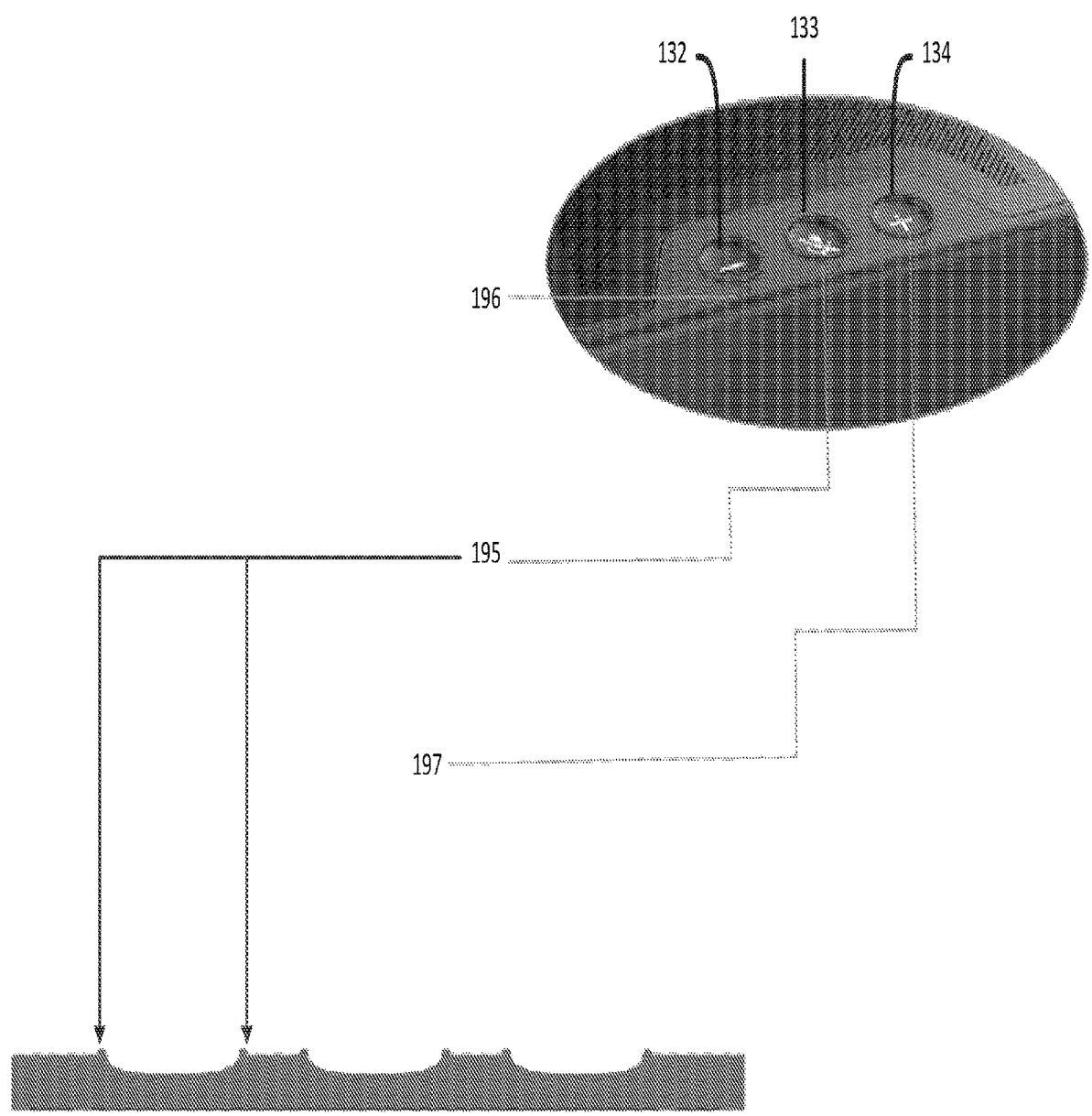
FIG. 3 shows a perspective view and a side view of buttons of a speakerphone in accordance with aspects of the disclosure.

In some examples, buttons of the speakerphone may have features that provide tactile feedback to users. Shown in FIG. 3 are views of buttons 132, 133, 134 of speakerphone 100. Each button of speakerphone 100 has a concave shape and includes a raised ring 195 around the button and a raised dot 196 by each button. The raised ring 195 and the raised dot 196 allow a user to recognize button location using touch, making it easier for visually impaired users to use the speakerphone. The features such as the raised ring and the raised dot may be manufactured as part of the top face of the speakerphone. The images of the buttons are shown to be a silkscreen print, such as the plus sign 197 for button 134.

Figure 4:
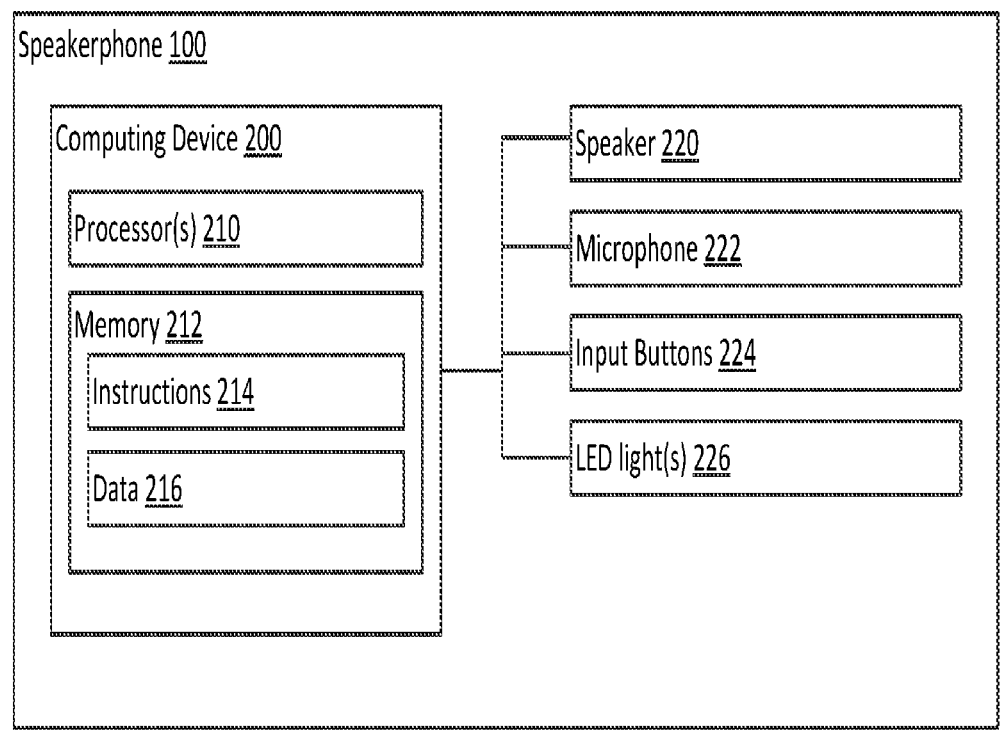
FIG. 4 is a functional diagram of a speakerphone in accordance with aspects of the present disclosure.

Each speakerphone, in addition to having a speaker and a microphone, also has input buttons, LED lights, and a computing device. The computing device may comprise one or more processors and a memory that stores instructions for operation of the speakerphone and other data. In FIG. 4, speakerphone 100 is depicted as having computing device 200 that includes processor(s) 210 and memory 212. Stored in memory 212 are instructions 214 for operation of the speakerphone and data 216. Computing device 200 is configured to operate speaker 220, microphone 222, input buttons 224, and LED lights 226

Figure 5:
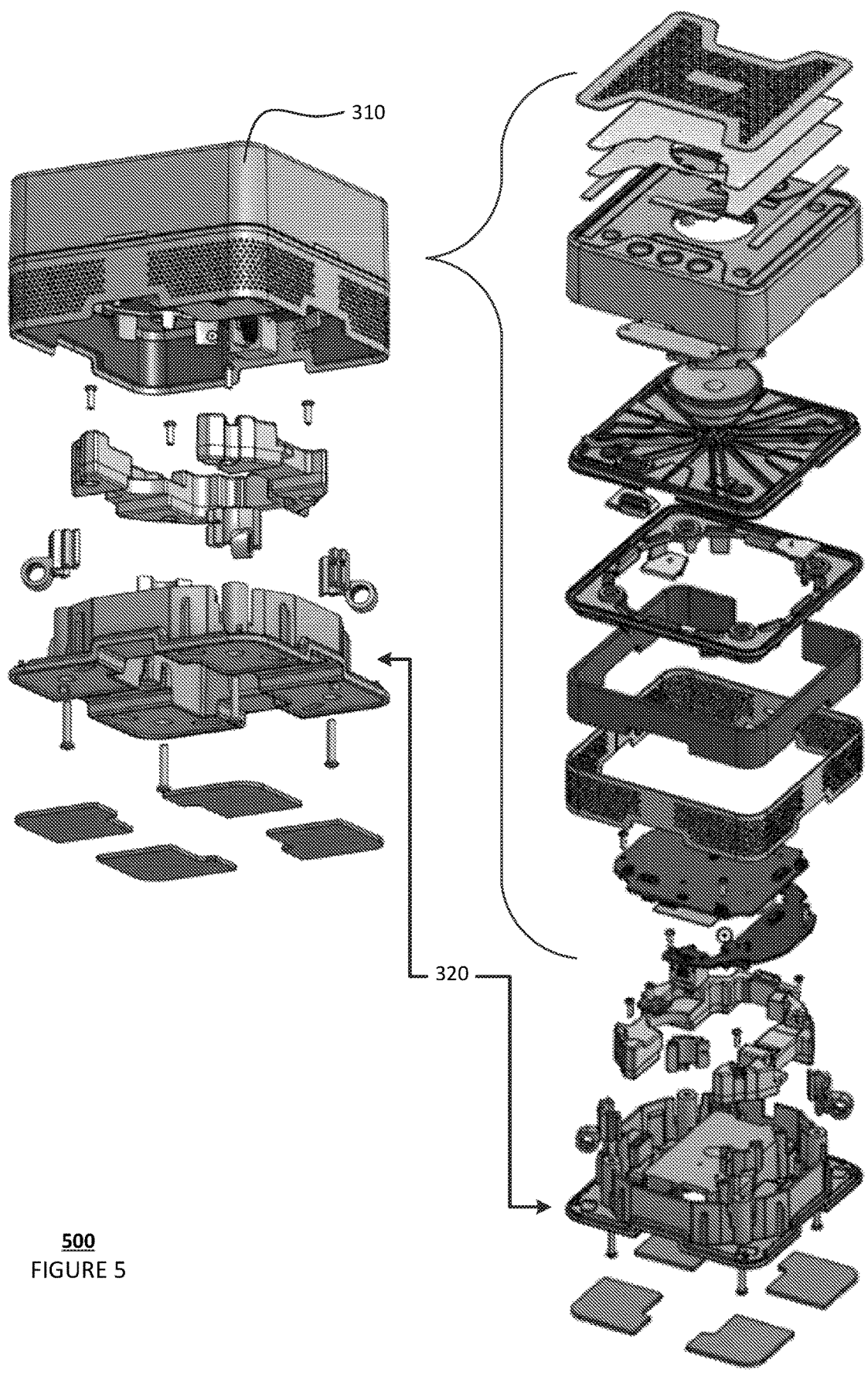
FIG. 5 show two exploded views of a speakerphone in accordance with an aspect of the present disclosure.
Figure 6A:
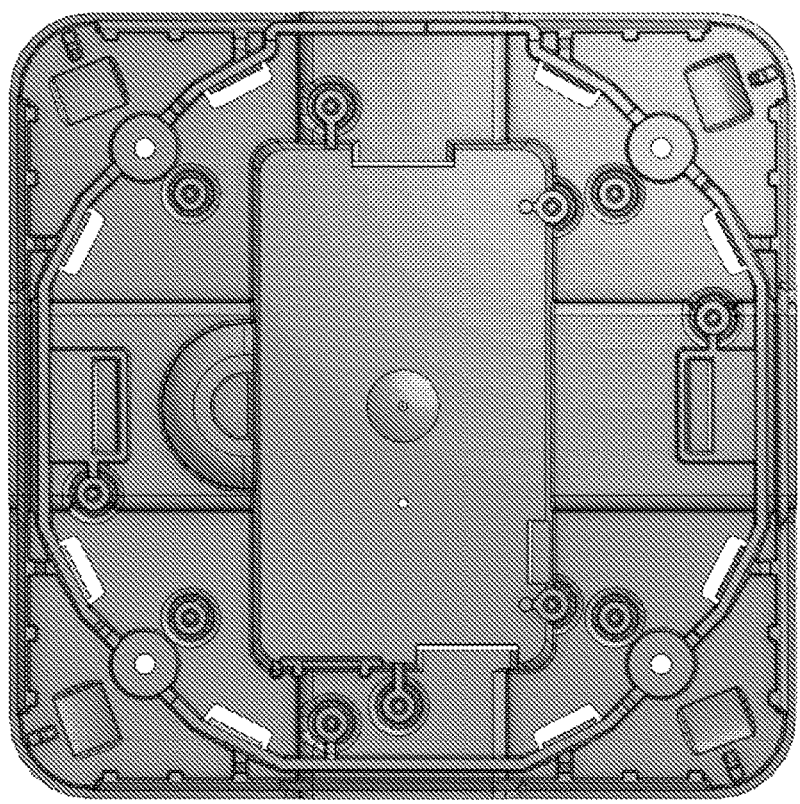
FIGS. 6A and 6B illustrate the interior and exterior sides of a bottom face component, respectively, without connection to the rest of the speakerphone.
Figure 6B:
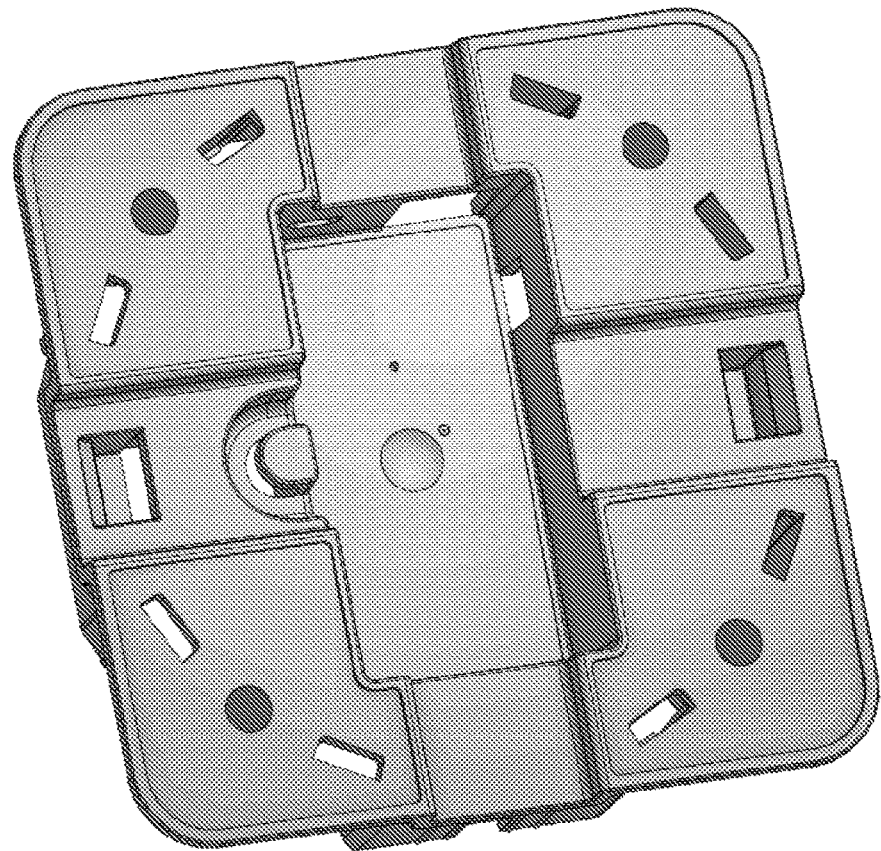
Figure 7:
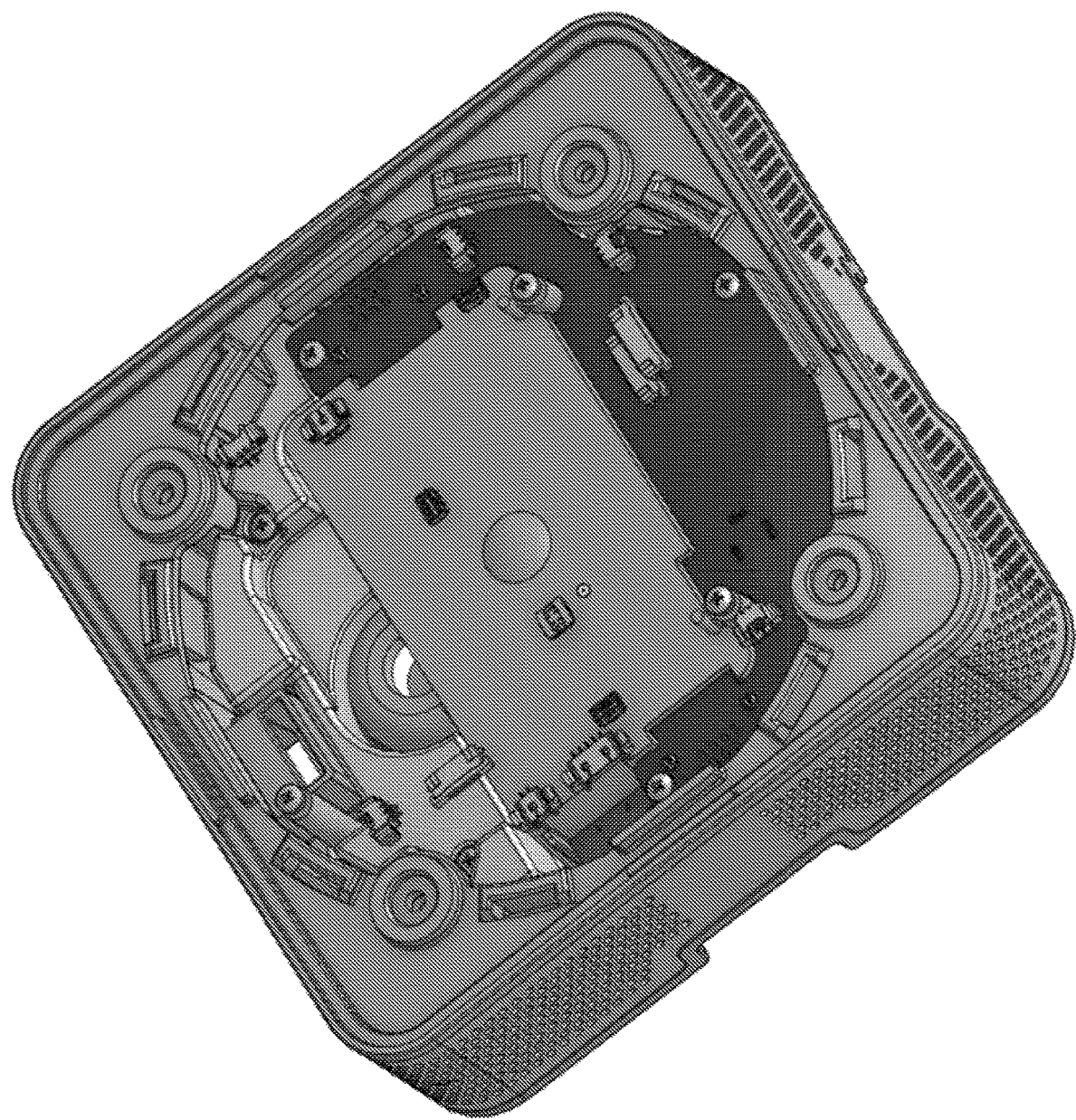
FIG. 7 shows an example of the lower half of the speakerphone with the upper half omitted for clarity. Here, the figure presents a view of the bottom face component as assembled as part of the speakerphone from the inside of the speakerphone, in accordance with aspects of the present disclosure.
Figure 8:
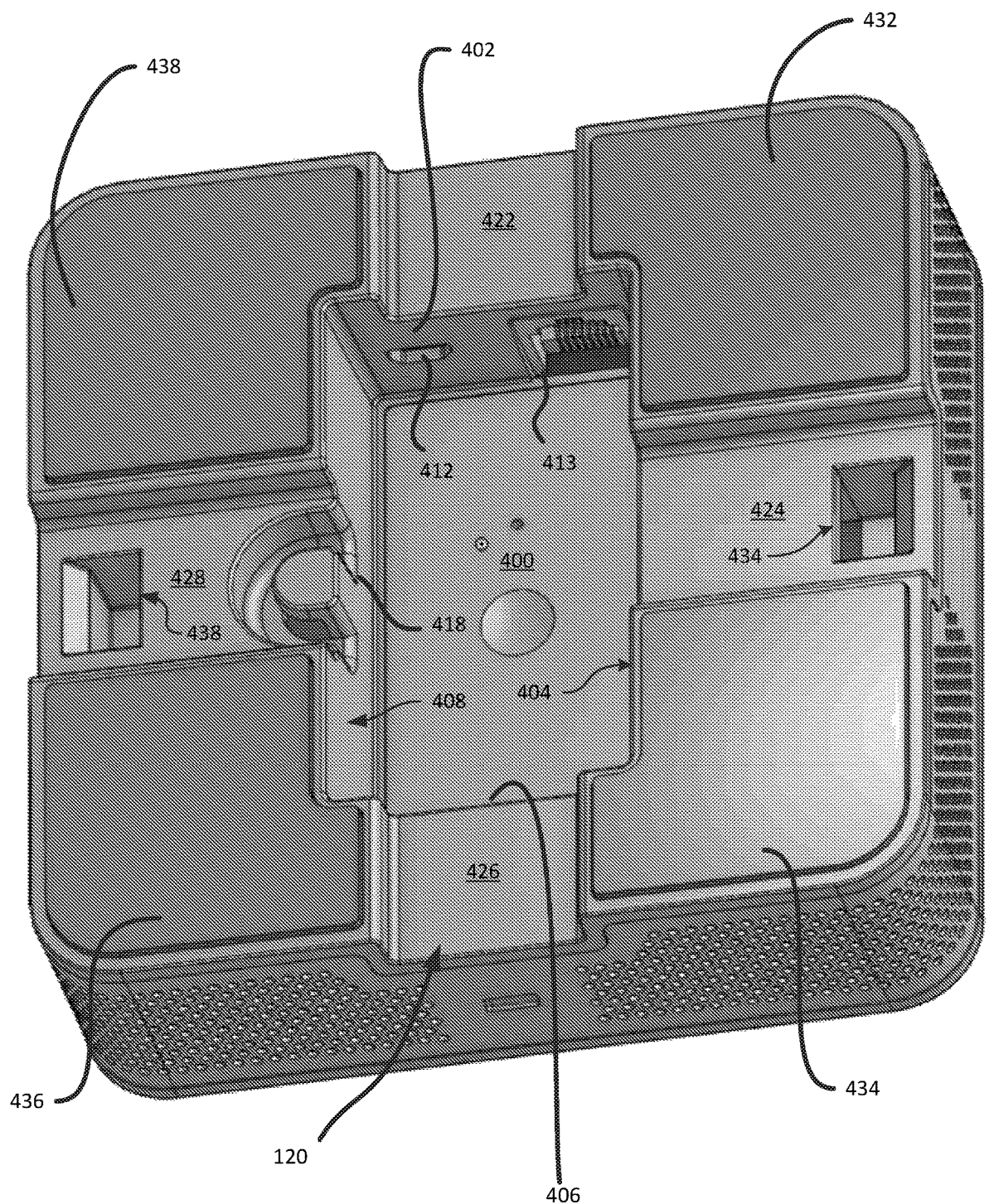
FIGS. 8-12 are perspective views of the bottom face of a speakerphone in accordance with aspects of the present disclosure.
Figure 9:
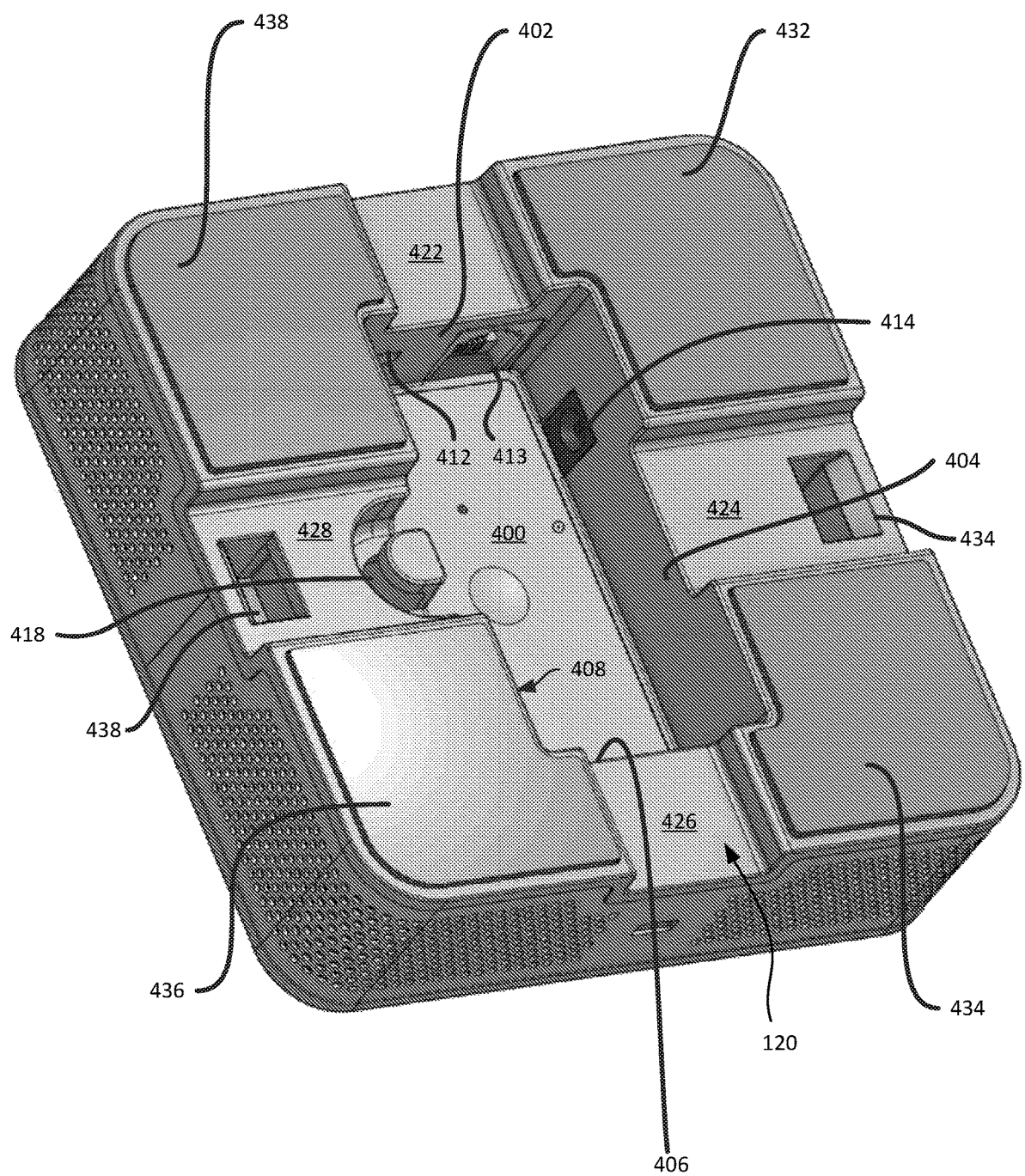
Figure 10:
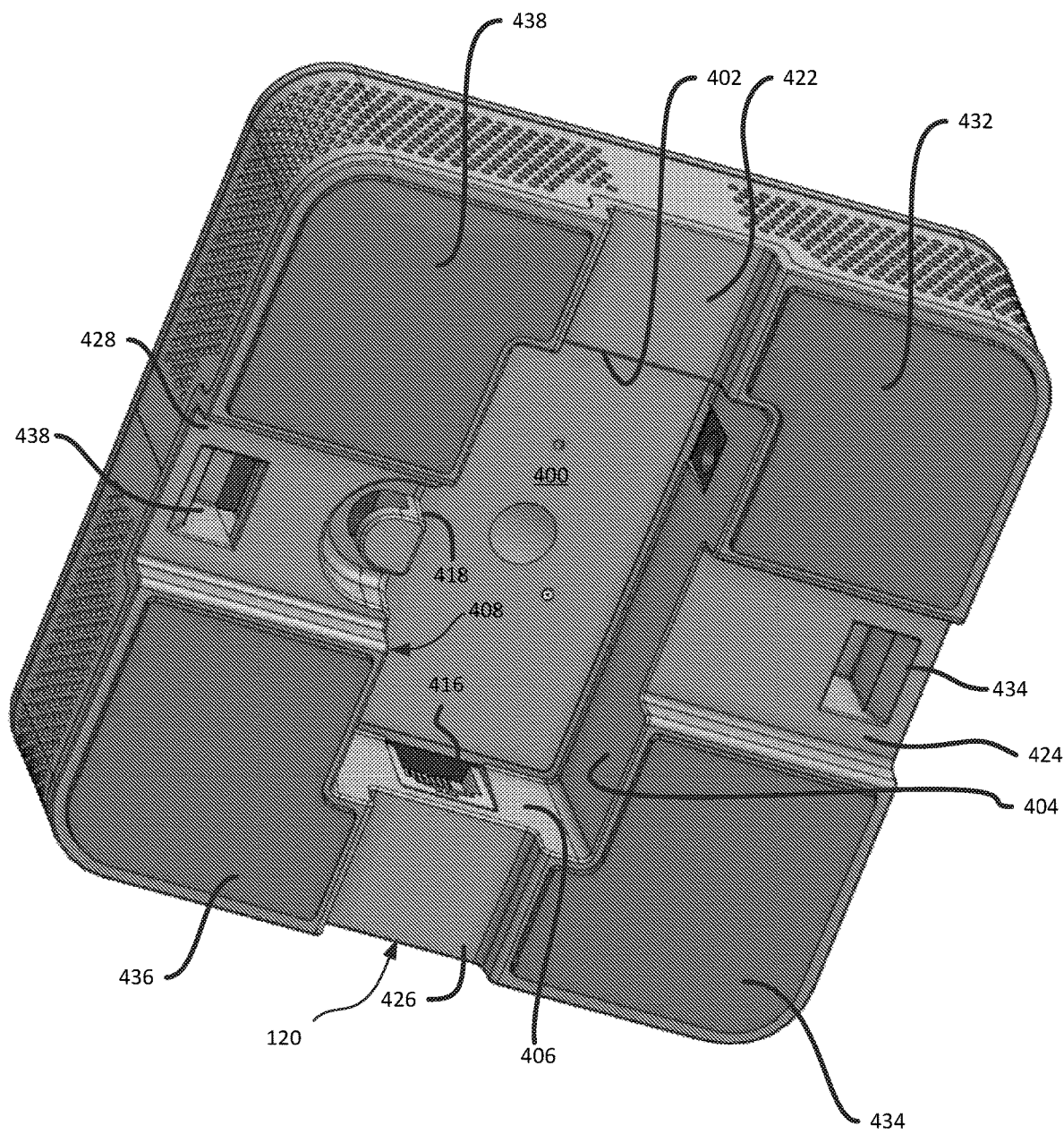
Figure 11:
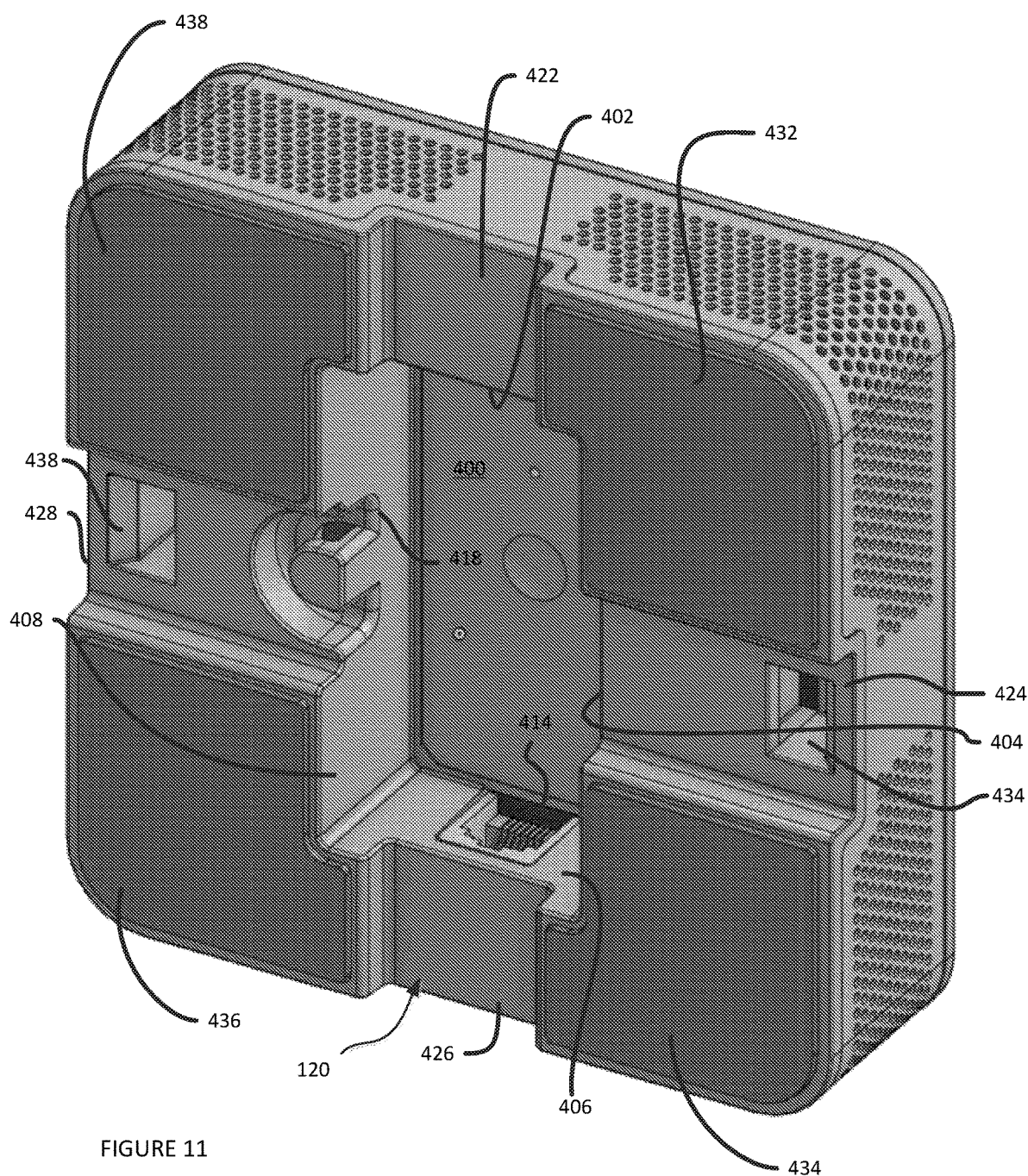

The speakerphone may comprise an assembly 500 of a plurality of components, as shown in FIG. 5. In particular, the speakerphone may comprise a top housing structure and a bottom face component. Top housing structure 310 comprises an assembly that includes the top face and the plurality of side walls of the speakerphone, leaving an open end. Components such as the speaker, microphone, processor(s), and memory may be assembled within the top housing structure. Bottom face component 320 includes an interior side, shown in FIG. 6A, that is configured to contact and/or couple with components of the top housing structure 310, such as the processor(s). Bottom face component 320 also includes an exterior side, shown in FIG. 6B, that comprises the bottom face of the speakerphone. When coupled with the top housing structure 310, as illustrated as assembly 700 in FIG. 7, bottom face component 320 closes the open end of the top housing structure 310. The assembly may include screws and other fastening means to hold together the plurality of components of the speakerphone.

The bottom face of the speakerphone includes a cavity that is configured to receive at least one cable connector. Specifically, the cavity may be configured to receive at least one cable connector at or proximate to an inner wall opposite the wall where the cable connector enters the cavity. The inner wall may include ports for cable connectors, such as USB plugs, RJ45 plugs, and/or power plugs, that may be positioned in the cavity such that cable connectors may attach to opposite sides and the cables may run parallel to each other in the cavity.

The cavity may include a rectangular well in the bottom face of the speakerphone. The rectangular well may have a first wall, a second wall, a third wall, and a fourth wall. The first wall may be parallel and opposite the third wall, and the second wall may be between the first wall and the third wall and may be parallel and opposite the fourth wall. In FIGS. 8-12, the cavity includes rectangular well 400, which has first wall 402, second wall 404, third wall 406, and fourth wall 408. First wall 402 is parallel and opposite third wall 406, and second wall 404 is between first wall 402 and third wall 406 and is parallel and opposite fourth wall 408.

The cavity may further include one or more channels between the edge of the bottom face to the cavity. The one or more channels may be shallower than the rectangular well. An attachment means may also be included on the bottom face for connection with a retention bracket to stabilize the speakerphone on a surface. Shown in the perspective views of FIGS. 8-12 is cavity including a rectangular well 400 at the center of the bottom face 120, four channels 422, 424, 426, 428 from the center of each edge of the bottom face 120 to the well 400, and two attachment features 434, 438 carved in two of the channels 424, 428. Channels 422, 424, 426, 428 are shaped the same as the cutouts of the side walls of the speakerphone 100, having a trapezoidal shape with sides that angle slightly outward toward bottom face 120 of speakerphone 100. The average width of the channel is about 26.5 mm, and the depth of the channel is about 7 mm. The cavity and four channels 422, 424, 426, 428 carve into the bottom face in a cross pattern.

The remaining portions of the bottom face of the speakerphone may be covered in material that provides vibration damping, such as ethylene propylene diene monomer rubber or cellular rubbers. The rest of the bottom faces apart from the well, channels, and attachment features comprise base pads. In the example implementation in FIGS. 8-12, the bottom face comprises four base pads 432, 434, 436, 438 located at the corners of the bottom face, interspersed between the four channels 422, 424, 426, 428 that are adapted to receive one or more cables therethrough. Base pad 432 is between channels 422 and 424; base pad 434 is between channels 424 and 426; base pad 436 is between channels 426 and 428; and base pad 438 is between channels 428 and 422. When in use, the base pads 432, 434, 436, 438 of the speakerphone are placed flat against a surface, such as a table, and the clearance between the table and the channels 422, 424, 426, 428 is large enough for installed cables to pass through. The base pads may be covered in a vibration damping material, such as cellular rubber.

A port may be positioned in the cavity such that installation of a cable in a different port in the cavity blocks access to the port. For example, ports included in the cavity may include a micro-USB port on a first wall of the cavity, a first RJ45 port positioned next to the micro-USB port on the first wall nearer to the second wall, a barrel power port positioned on the second wall close to the first wall, and a second RJ45 port positioned on the third wall at a greater distance from the second wall than the first RJ45 port. The first RJ45 port on the first wall and the barrel power plug on the second wall may be close enough to each other that when an RJ45 cable is inserted in the first RJ45 port, the RJ45 plug blocks access to the barrel power port, and vice versa.

The well 400 shown in FIGS. 8-12 is configured to receive a plurality of plugs. The well walls 402, 404, 406, 408 are deep enough such that installed cable plugs fit underneath the speakerphone 100 so that the speakerphone 100 may be placed on a surface and fully contact the surface. In this, the well 400 has a depth of 24.5 mm from the bottom face 120 of the speakerphone and/or 17.5 mm from the depth of the channels 422, 424, 426, 428. First wall 402 includes a micro-USB port 412 and a first RJ45 port 413, a second wall 404 includes a barrel power port 414, a third wall 406 includes a second RJ45 port 416, and a fourth wall 408 includes a cable guide 418.

The distance between the first and third walls and the second and fourth walls may be large enough to accommodate all the maximum number of cables necessary for speakerphone operation. For example, the cavity shown in FIGS. 8-12 has distances of about 73.5 mm between the first 402 and third 406 walls and about 38.5 mm between the second 404 and fourth 408 walls. This implementation is able to accommodate a barrel power cable connector, an RJ45 cable connector, and a micro-USB cable connector.

The cavity may also include guides for at least one cable. A cable guide may be included as part of the fourth wall. The cable guide may include two openings in the fourth wall and a U-shaped channel cut into the bottom face of the speakerphone. The U-shaped channel may be shallower than the well. The cable guide may be used to coil the micro-USB cable and guide the micro-USB plug to the micro-USB port. The coiling of the micro-USB cable may secure the connection and also divert the micro-USB cable away from an RJ45 cable inserted in the second RJ45 port on the third wall.

Figure 13A:
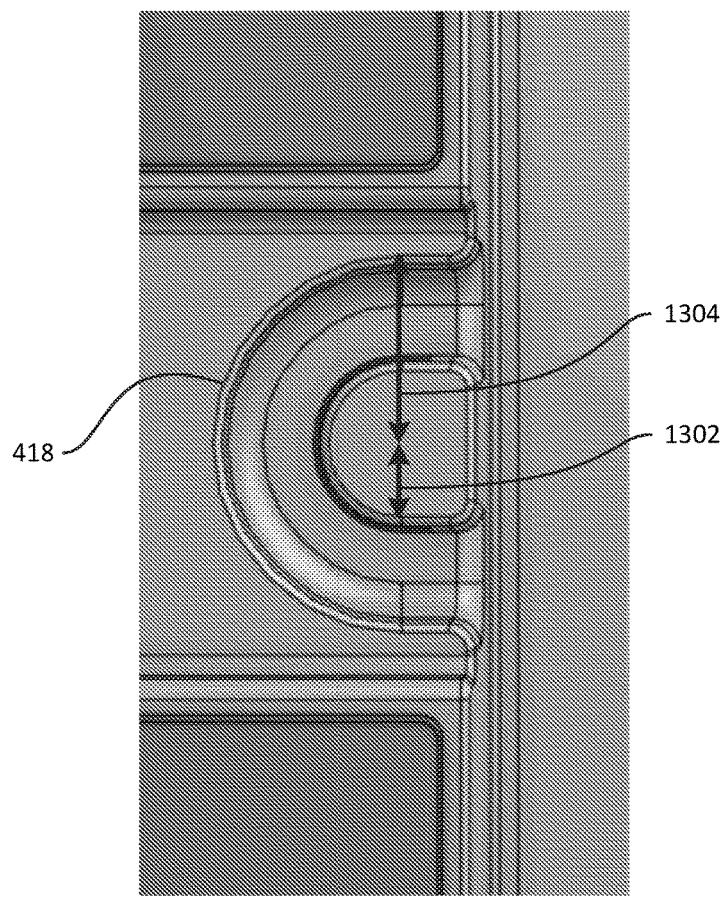
FIGS. 13A and 13B are zoomed in views of the cable guide in accordance with aspects of the present disclosure.
Figure 13B:
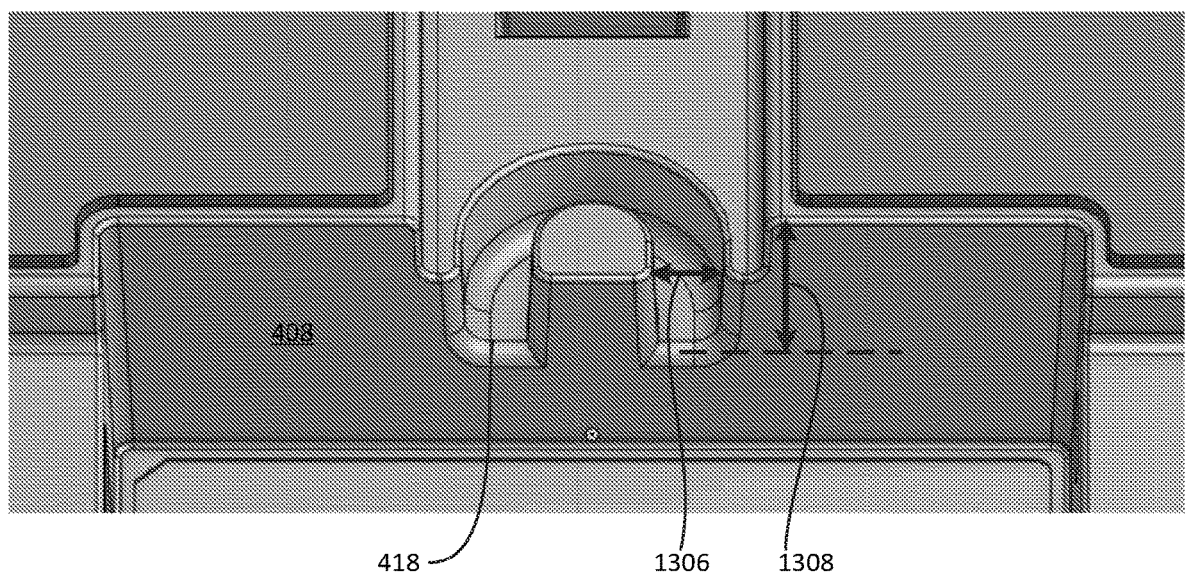

As depicted in FIGS. 8-12, cable guide 418 is included in fourth wall 408. Cable guide 418 comprises two openings in fourth wall 408 and a U-shaped channel cut into bottom face 120 to a shallower depth than the well 400 and deeper depth than channels 422, 424, 426, 428. As shown in FIG. 13A, cable guide 418 comprises a semicircle-shaped channel. The cable guide channel has an inner radius 1302 and an outer radius 1304 greater than the inner radios 1302. For example, the inner radius may be about 4.75 mm, and the outer radius may be about 10.1 mm. As shown in FIG. 13B, the cable guide channel also has a width 1306 and a depth 1308. In this example, the cable guide channel width is about 5-6 mm, and the depth is about 14.8 mm from the bottom face of the speakerphone or 7.8 mm from the channel depth. The specific dimensions discussed herein are non-limiting, and may vary, for instance to accommodate different types and diameters of cables. In one scenario, the inner and outer radii 1302, 1304 are selected to provide an acceptable cable bending radius, which reduces the likelihood of an electrical break in the wiring of the cable.

In operation, more than one conference speakerphone having the above-described configuration may be connected and used for conducting a given call. A plurality of speakerphones may be daisy-chained together, including a master unit, an end unit, and any number of mid units connected between the master unit and the end unit. The cavity of each speakerphone includes all ports needed for operation as any of a master unit, an end unit, or a mid unit.

Figure 14A:
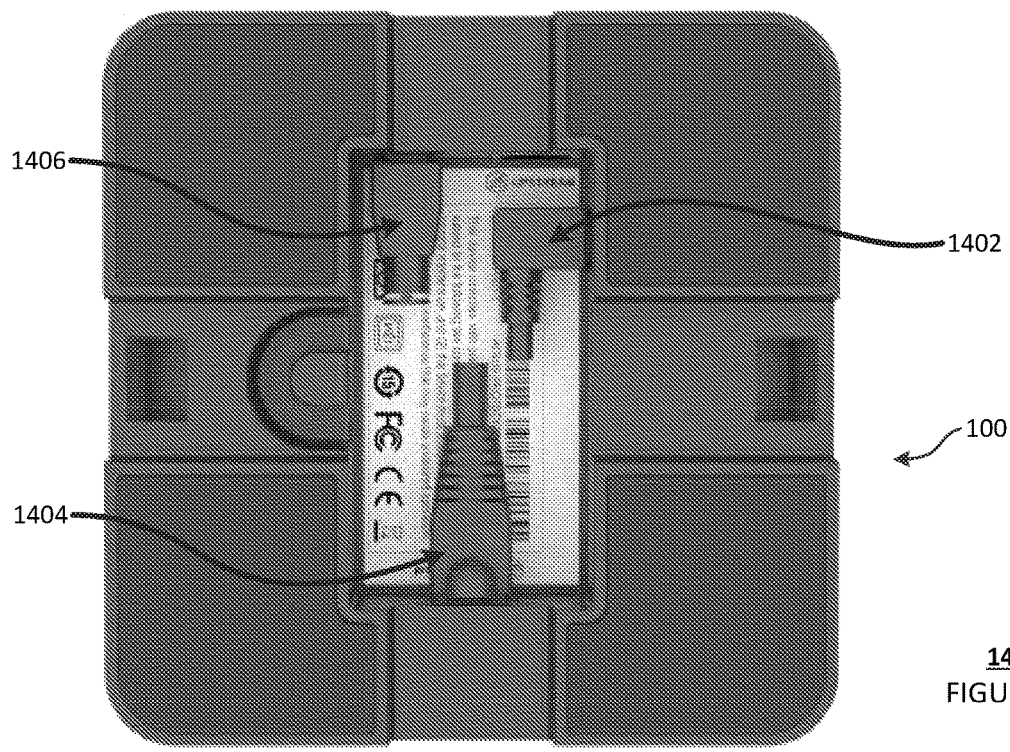
FIGS. 14A and 14B show views of the bottom faces of speakerphones wired for use as a master unit of a string of speakerphones in accordance with aspects of the disclosure.
Figure 14B:
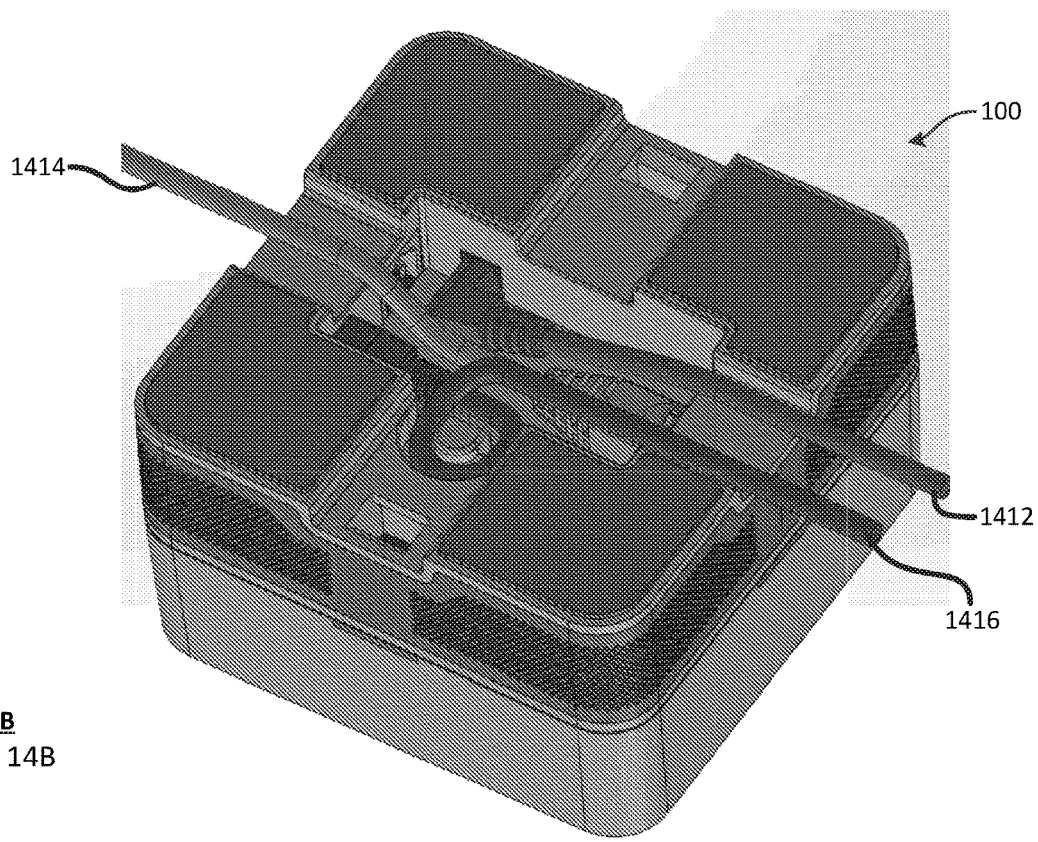

For example, to use the speakerphone as a master unit, a power barrel plug may connect the speakerphone to a power source, a micro-USB plug may connect to a computer or other audio source, and an RJ45 cable may connect to the next speakerphone. As previously discussed, the power barrel plug may block the first RJ45 port, so the RJ45 cable can only be inserted in the second RJ45 cable. FIGS. 14A and 14B show views of the bottom face of speakerphone 100 wired for use as a master unit of a string of speakerphones in accordance with aspects of the disclosure. The speakerphone 100 is wired with a barrel power plug 1402, 1412, an RJ45 plug 1404, 1414, and a micro-USB plug 1406, 1416. As shown in FIG. 14B, the micro-USB cable 1416, is coiled around the cable guide in a loop to better secure the plug in the port. In operation the bottom face is in contact with the table or other surface.

Figure 15A:
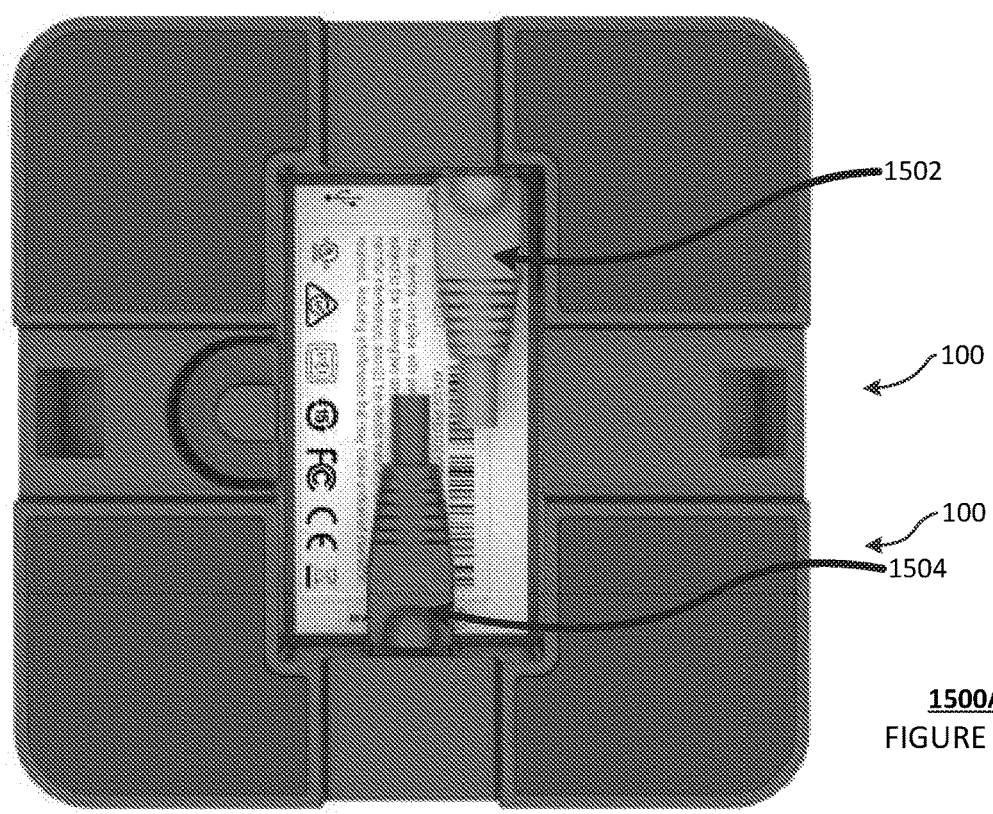
FIGS. 15A and 15B show views of the bottom faces of speakerphones wired for use as a mid unit of a string of speakerphones in accordance with aspects of the disclosure.
Figure 15B:
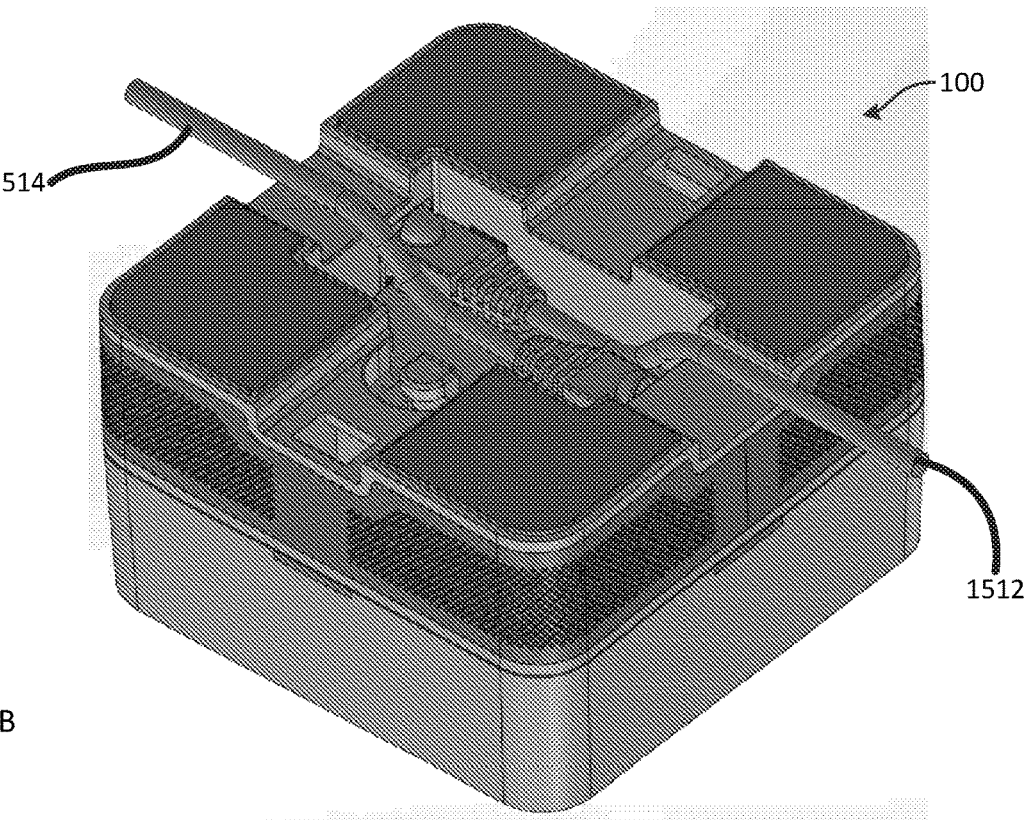

To use the speakerphone as a mid unit, the RJ45 cable from the previous unit may be inserted in one of the two RJ45 ports, and a new RJ45 cable into the other RJ45 port to be connected to the next unit. FIGS. 15A and 15B show views of the bottom face of speakerphone 100 wired for use as a mid unit of a string of speakerphones in accordance with aspects of the disclosure. The speakerphone 100 is wired with two RJ45 plugs 1502 and 1504, 1512 and 1514 connected to opposite walls of the cavity of the speakerphone, with portions of the RJ45 cables overlapping in parallel within the cavity. One RJ45 cable is for input and the other RJ45 cable is for output. In operation the bottom face is in contact with the table or other surface.

Figure 16:
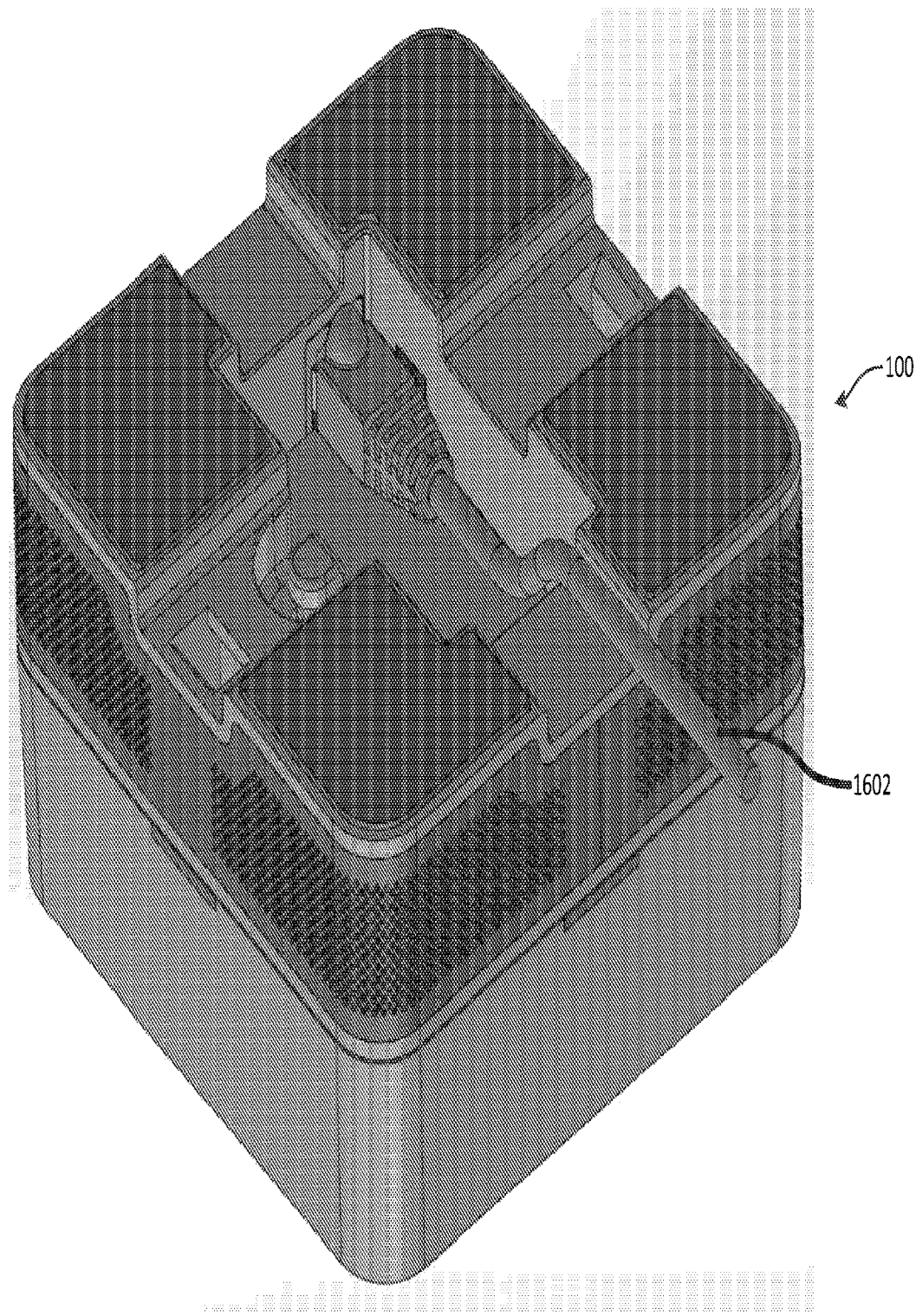
FIG. 16 shows a view of the bottom face of a speakerphone wired for use as an end unit of a string of speakerphones in accordance with aspects of the disclosure.

To use the speakerphone as an end unit, the RJ45 cable from the previous unit may be inserted in one of the two RJ45 ports, with no other cable connected. FIG. 16 shows a view of the bottom face of speakerphone 100 wired for use as an end unit of a string of speakerphones in accordance with aspects of the disclosure. The speakerphone 100 is wired with a single RJ45 plug 1602. In operation the bottom face is in contact with the table or other surface.

Figure 17A:
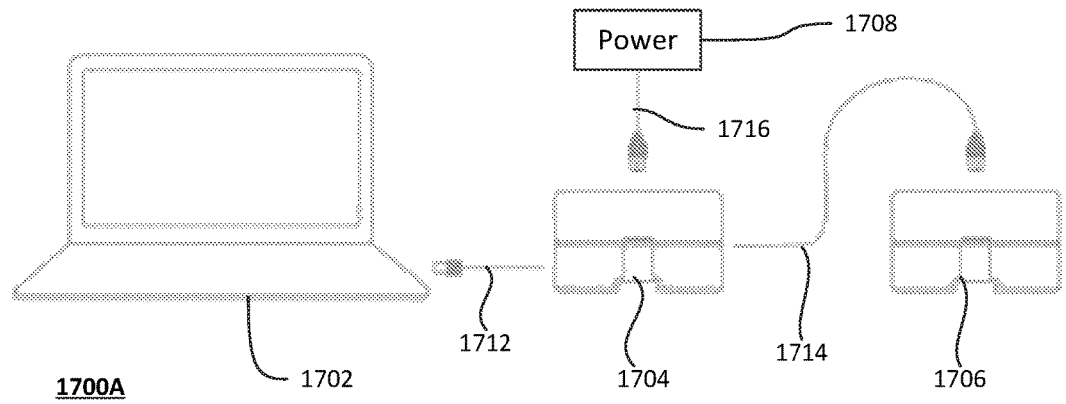
FIGS. 17A-C are pictorial diagrams of examples of two speakerphones tethered together for conferencing in accordance with aspects of the disclosure.
Figure 17B:
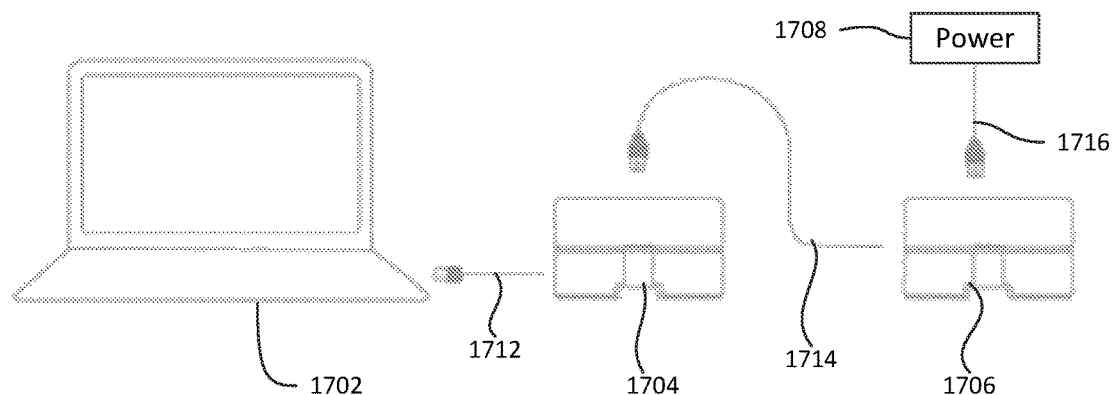
Figure 17C:
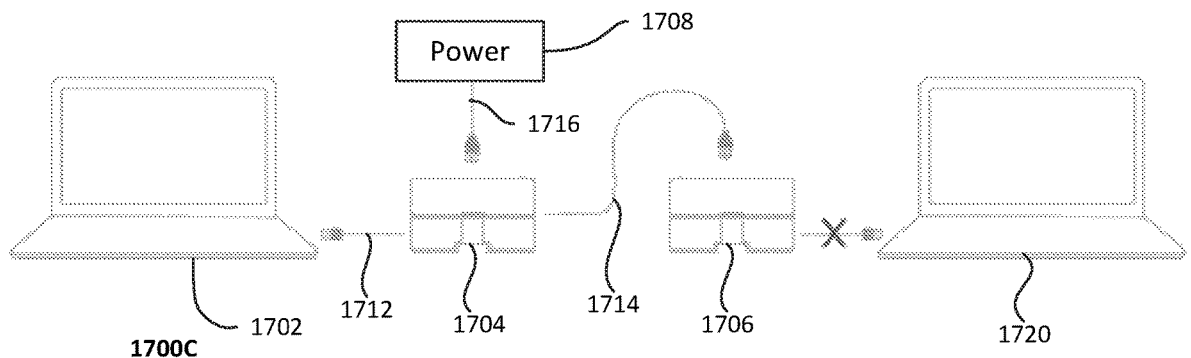

FIGS. 17A-C are pictorial diagrams of examples of two speakerphones tethered together for conferencing in accordance with aspects of the disclosure. As shown in FIG. 17A, speakerphone setup 1700A of an audio source 1702 and two speakerphones configured as described above includes a cable connection 1712 between audio source 1702 and a first speakerphone 1704, for example, via a USB cable, and a cable connection 1714 between first speakerphone 1704 and second speakerphone 1706, for example, via an RJ45 cable. A power source 1708 is connected to first speakerphone 1704 using power cable 1716. In this example, audio source 1702 is a single computer, first speakerphone 1704 functions as a master unit 1704 since first speakerphone 1704 is directly connected to the audio source, and second speakerphone 1706 functions as an end unit.

Alternatively, in FIG. 17B, installation of speakerphone set up 1700B includes a cable connection 1712 between audio source 1702 and first speakerphone 1704, for example, via a USB cable, and a cable connection 1714 between first speakerphone 1704 and second speakerphone 1706, for example, via an RJ45 cable. In this example, a power source 1708 is connected to second speakerphone 1706 via power cable 1716. First speakerphone 1704 still functions as a master unit, and second speakerphone 1706 as an end unit.

As shown in FIG. 17C, it is an improper installation 1700C to connect speakerphone setup 1700A or 1700B to a second computer 1720 or other audio or power source.

Figure 18A:
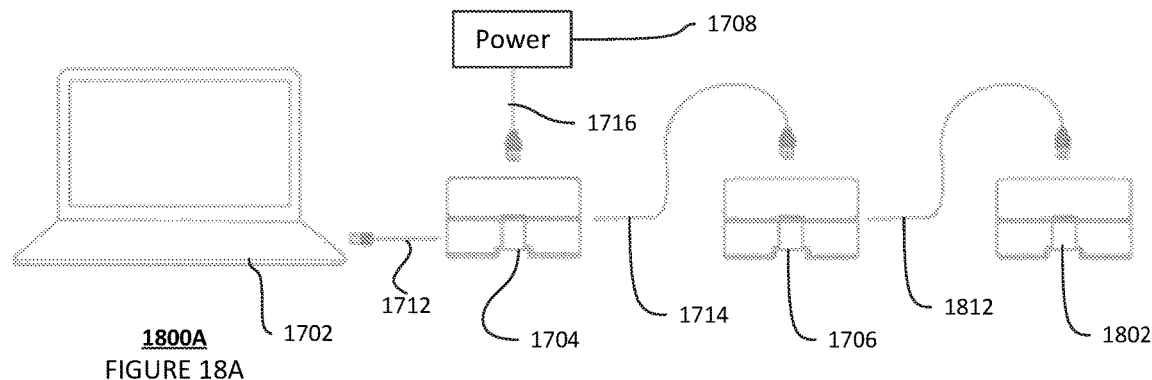
FIGS. 18A-C are pictorial diagrams of examples of more than two speakers tethered together for conferencing in accordance with aspects of the disclosure.
Figure 18B:
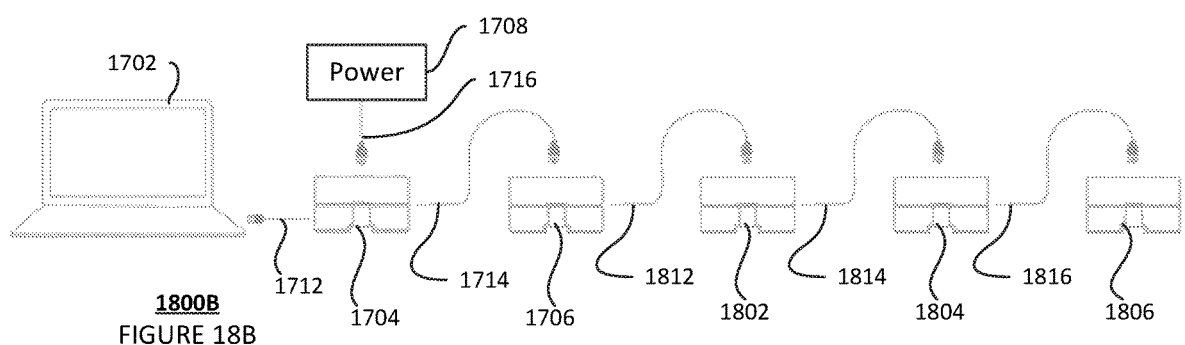
Figure 18C:
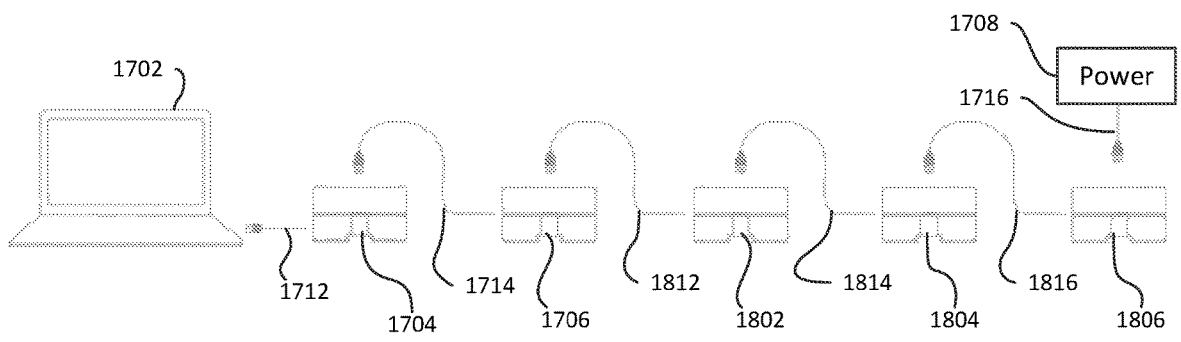

FIGS. 18A-C are pictorial diagrams of examples of more than two speakerphones tethered together for conferencing in accordance with aspects of the disclosure. Similar to the two-speakerphone setup in FIGS. 17A and 17B, the speakerphone setup 1800A in FIG. 18A includes a first speakerphone 1704 with a cable connection 1712 to audio source such as a computer, for example, via a USB cable. The plurality of speakerphones 1704, 1706, 1802 are connected one to the next starting from first speakerphone 1704 to second speakerphone 1706, via cable connection 1714, and second speakerphone 1706 to third speakerphone 1802 via cable connection 1812. The cable connections 1714, 1812 may be via RJ45 cables. The first speakerphone functions as the master unit, the second speakerphone 1706 as the mid unit, and the third speakerphone 1802 as the end unit. The power source 1708 is properly installed via power cable 1716 to first speakerphone 1704, the master unit.

Speakerphone setup 1800B in FIG. 18B includes setup 1800A with an addition of two additional speakerphones 1804, 1806. Cable connection 1814 connects speakerphone 1804 to speakerphone 1802 to continue the string of speakerphones, and cable connection 1816 connects speakerphone 1806 to 1804, making speakerphone 1806 the new end unit of the setup. Speakerphone setup 1800C of FIG. 18C is a variation of speakerphone setup 1800B differing in the location of the connection to power source 1708. As illustrated, power source 1708 is properly installed to speakerphone 1806 via power cable 1716.

Figure 19:
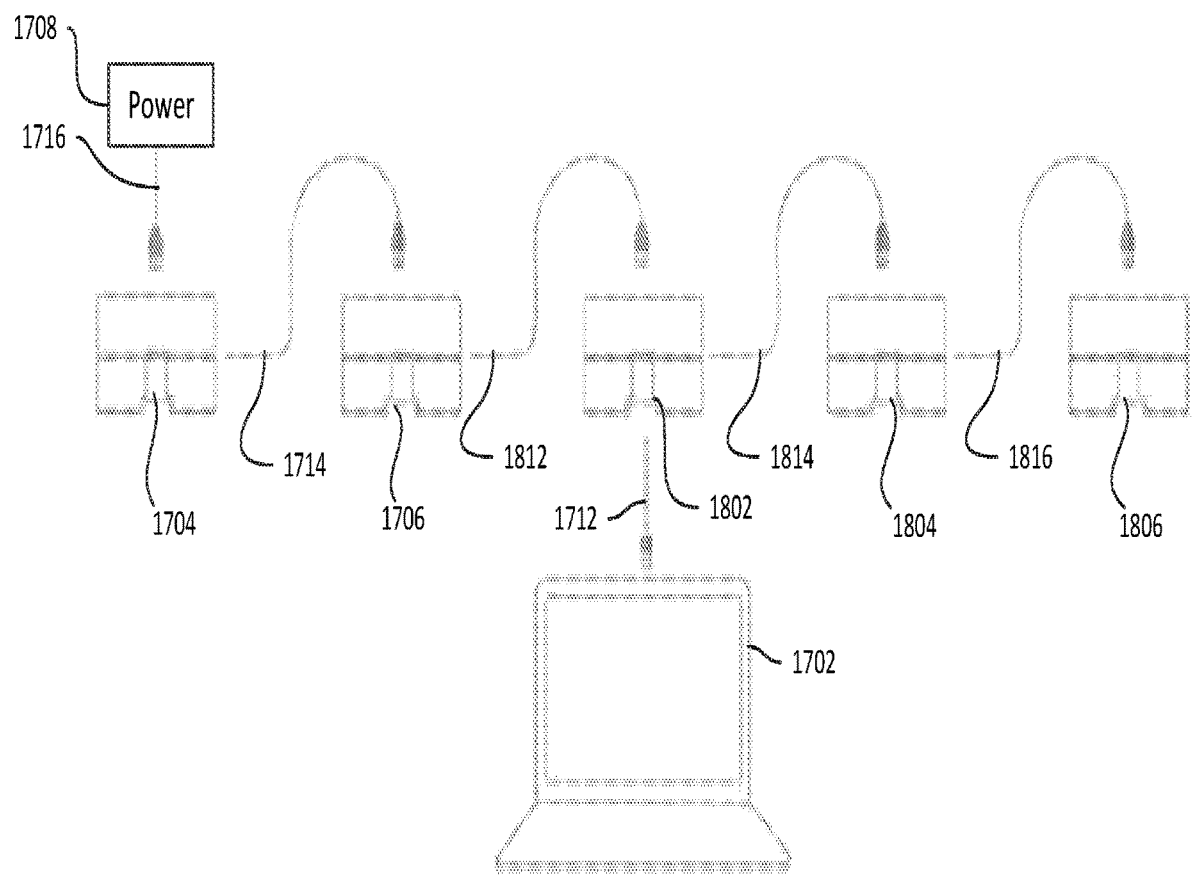
FIG. 19 is a pictorial diagram of a further example of more than two speakers tethered together for conferencing in accordance with aspects of the disclosure.

Speakerphone setup 1900 of FIG. 19 shows a further variation of setup 1800B. In this example, audio source 1702 is connected to speakerphone 1802, a mid unit, rather than speakerphone 1704, which becomes a second end unit to the string of speakerphones. It is possible to connect the computer to any of the mid units of a string of speakerphones. Here, power source 1708 remains connected to speakerphone 1704, supplying power to the other speakerphones in the string, but may alternatively be connected to speakerphone 1806, as shown in FIG. 18C.

When tethered together as described above, a processor in each of the speakerphones, such as processor(s) 210, may determine whether a given speakerphone is a master unit, mid unit, or an end unit based on detecting which cables are connected to the speakerphone. The processor may then follow instructions stored in the memory of the speakerphone, such as instructions 214 in memory 212, to operate the speakerphone as the determined unit. The processor may also determine whether a given speakerphone has cables improperly connected and provide an indication of the improper connection, for example, using the LED lights 226.

One mixed audio signal is provided to an audio source, such audio source 1702, and output from the audio source to the full string of speakerphones. The full string of speakerphones then operates to provide audio output from every speakerphone in the full string as a single speaker. Using multiple speakerphones in this way may provide enough sound to fill a larger room such that call participants may hear the call clearly no matter where they are in the room. In addition, because each speakerphone also has a microphone, such as microphone 222, call participants also may be clearly heard no matter where they are in the room. This multiple-speakerphone setup is significantly less costly and provides better audio than traditional conference room systems.

In some implementations, the buttons on each tethered speakerphone are synchronized. For example, pressing the mute button on one speakerphone unit causes all speakerphone units to be muted. Pressing a volume control button on one unit causes the audio volume to be raised or lowered on all units. For this synchronized functioning, touch input may be received at a given speakerphone in a string of speakerphones connected as disclosed above. Then, the processors in each of the other speakerphones in the string of speakerphones receive instructions based on the touch input in the given speakerphone via the RJ45 cables linking the speakerphones. For instance, in setup 1900, touch input, such as pressing the mute button, may be received at any one of speakerphones 1704, 1706, 1802, 1804, and 1806. In response, all the speakerphones will receive instructions, such as to mute their respective microphones, via the cable connections 1714, 1812, 1814, and 1816.

Alternatively, the speakerphone may include one or more USB ports at any location on the speakerphone for connection to an audio source. For example, a USB port may be on one of the side walls of the speakerphone for ease of access.

Figure 20:
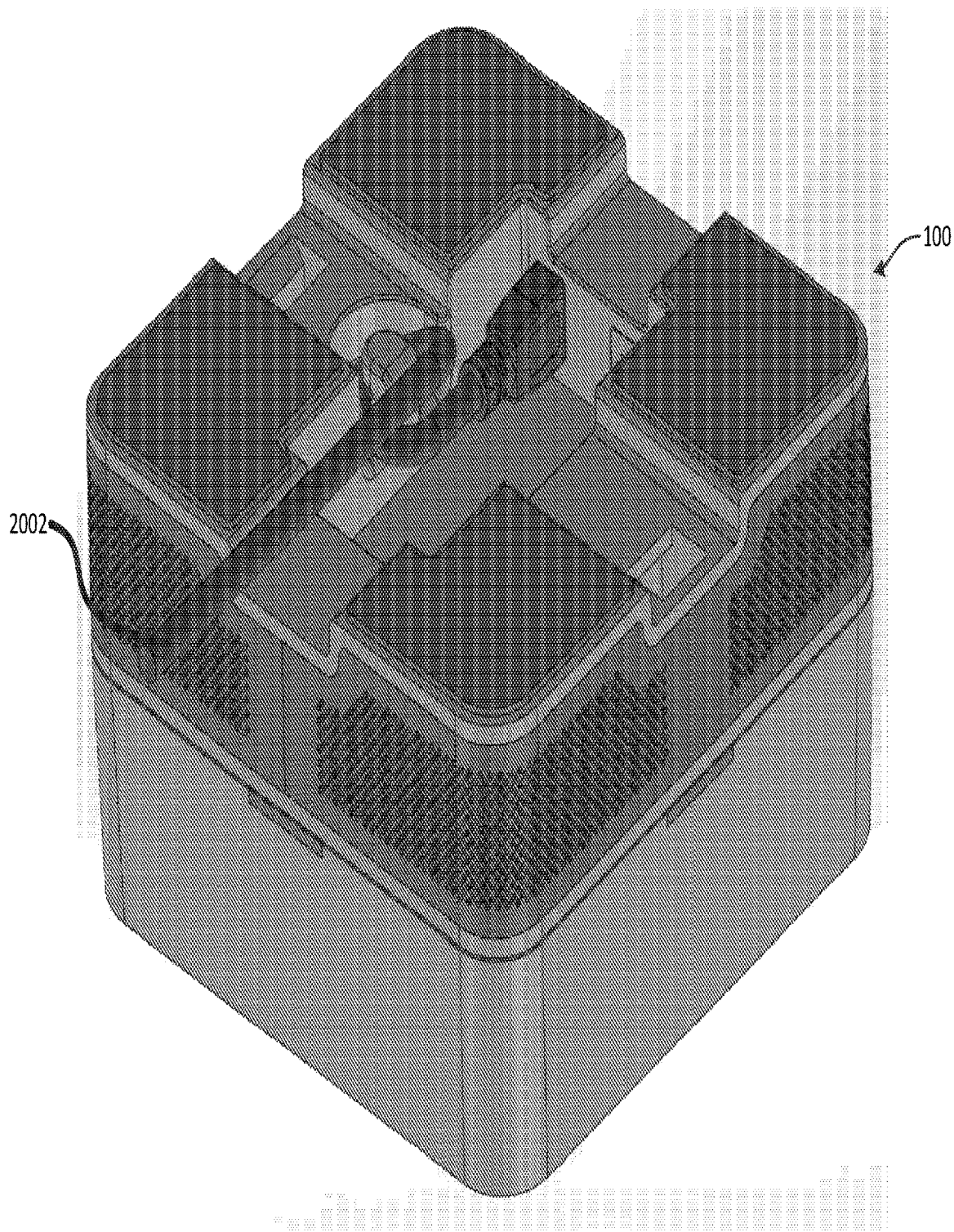
FIG. 20 shows a view of the bottom face of a speakerphone wired for single unit use in accordance with aspects of the disclosure.
Figure 21A:
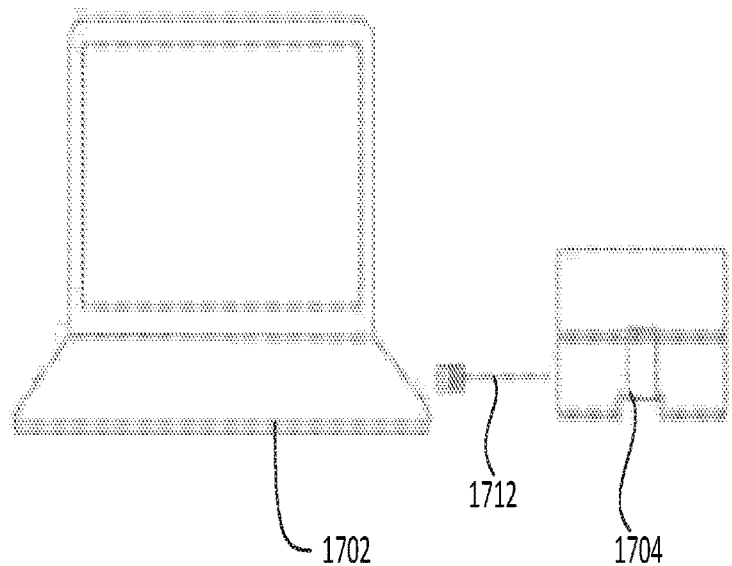
FIGS. 21A and 21B are pictorial diagrams of speakerphones wired for use as a single unit in accordance with aspects of the disclosure.
Figure 21B:
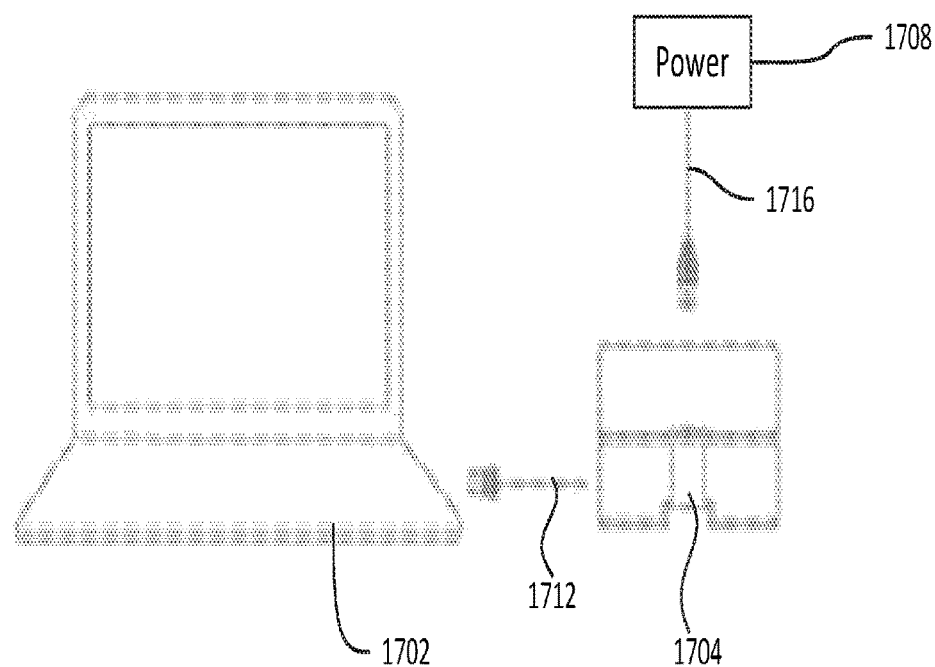

In further examples, a single speakerphone may be used to conduct a given call. In this case, the speakerphone setup only requires a USB connection with the audio source. FIG. 20 shows a view of the bottom face of a speakerphone wired for single unit use. As shown, only a USB connection 2002 is used to connect to an audio source. The audio source, such as a computer, may also serve as the power source for the speakerphone. FIGS. 21A and 21B show setups 2100A and 2100B for a speakerphone used as a single unit. The speakerphone 1704 is connected to audio source 1702, such as a computer, via a cable connection 1712, such as a USB cable. Audio source 1702 may be a type that may serve as both the audio source and a power source, in which case the speakerphone need not be connected to a separate power source, as shown in setup 2100A. However, as shown in setup 2100B, the speakerphone is also properly installed when connected to a separate power source 1708 via power cable 1716.

The features of the speakerphone described above allows for simple and intuitive design. The configuration of the ports in the cavity of the speakerphone not only creates a more efficient use of space since stiff wires are able to lay flat instead of bent at an angle, but the configuration also allows for intuitive and safe installation. When used as a mid unit, for example, the speakerphone is not directly connected to a power supply. Also, there is no confusion as to which speakerphone may be used as which unit, since each speakerphone device is configured to work in any position in the chain. The button features described above allow for the speakerphone to be used easily by users who are visually impaired.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

What is claimed is:

1. A plurality of connected electronic devices, comprising:
   a first electronic device configured to be connected to an external audio source; and
   a second electronic device configured to be connected to the first electronic device,
   wherein each of the plurality of electronic devices includes a housing configured to house at least a speaker and a microphone, the housing including a cavity defined by a well formed in a bottom face of the housing, the well including:
      a first wall including a first port; and
      a second wall adjacent to the first wall, the second wall including a second port;
   wherein, in a first mode, access to the first port is blocked, and, in a second mode, access to the second port is blocked.

2. The plurality of connected electronic devices of claim 1, wherein the first electronic device is a master-unit electronic device is configured to be connected to the external audio source to receive audio content from the external audio source and to transmit the received audio content to the second electronic device.

3. The plurality of connected electronic devices of claim 2, wherein the well includes:
   a third wall adjacent to the second wall, the third wall including a third port; and
   a fourth wall adjacent to the third wall, and adjacent to the first wall,
   wherein the first electronic device is configured in the first mode in which
      the second port of the first electronic device is configured to receive a connector of a first cable such that access to the first port of the first electronic device is blocked;
      the third port of the first electronic device is configured to receive a first connector of a second cable connecting the first electronic device to the second electronic device; and
      a fourth port in the first wall of the first electronic device is configured to receive a connector of a third cable connecting the first electronic device to the external audio source.

4. The plurality of connected electronic devices of claim 3, wherein the second electronic device is an end-unit electronic device configured in the second mode in which
   the first port of the second electronic device is configured to receive a second connector of the second cable such that access to the first port of the second electronic device is blocked and the second cable connects the first electronic device and the second electronic device.

5. The plurality of connected electronic devices of claim 3, wherein
   the first port and the third port are configured to receive connectors of data link cables to selectively connect pairs of electronic devices of the plurality of electronic devices;
   the second port is configured to receive a connector of a power to connect the first electronic device to an external power source; and
   the fourth port is configured to receive a connector of a USB cable.

6. The plurality of connected electronic devices of claim 3, wherein the plurality of electronic devices includes a third electronic device connected to the second electronic device, such that the second electronic device is a mid-unit electronic device configured in the second mode, and the third electronic device is an end-unit electronic device configured in the second mode.

7. The plurality of connected electronic devices of claim 6, wherein
   the first port of the second electronic device is configured to receive a second connector of the second cable from the first electronic device such that access to the first port of the second electronic device is blocked; and
   the third port of the second electronic device is configured to receive a first connector of a fourth cable to connect the second electronic device to the third electronic device.

8. The plurality of connected electronic devices of claim 7, wherein
   the first port of the third electronic device is configured to receive a second connector of the third cable from the second electronic device such that access to the first port of the third electronic device is blocked, and the fourth cable connects the second electronic device and the third electronic device.

9. The plurality of connected electronic devices of claim 1, wherein the cavity further comprises:
   a first channel extending between a first side wall of the housing and the well; and
   a second channel extending between a second side wall of housing and the well.

10. The plurality of connected electronic devices of claim 9, wherein
    the first channel has a first depth configured to receive at least one of the first cable or the second cable therethrough;
    the second channel has a second depth configured to receive at least one of the first cable or the second cable therethrough;
    the well has a third depth configured to receive a connector of the first cable and a connector of the second cable therein; and
    the well depth of the well is greater than the first depth of the first channel, and greater than the second depth of the second channel.

11. The plurality of connected electronic devices of claim 10, wherein the well includes:
    a third wall adjacent to the second wall, the third wall including a third port; and
    a fourth wall adjacent to the third wall, and adjacent to the first wall, and wherein
    the first channel extends between a top end portion of the first wall of the well and the first side wall of the housing;
    the second channel extends between a top end portion of the third wall of the well and the second side wall of the housing; and
    further comprising a cable guide formed on the bottom face of the housing, adjacent to a top end portion of the third wall of the well.

12. The plurality of connected electronic devices of claim 11, further comprising a fourth port in the first wall of the well, wherein the cable guide is configured to guide a cable, having a connector thereof connected to the fourth port, from the fourth port through the second channel.

13. The plurality of connected electronic devices of claim 1, wherein each of the plurality of electronic devices includes a processor configured to:
   detect at least one cable connected to the respective electronic device;
   determine that the respective electronic device is connected to another electronic device of the plurality of electronic devices based on the detected at least one cable;
   determine a type of the respective electronic device including one of a master-unit electronic device, a mid-unit electronic device or an end-unit electronic device, in response to the determination that the respective electronic device is connected to another electronic device;
   operate the respective electronic device according to the determined type of the respective electronic device;
   determine whether one or more cables are improperly connected to the electronic device based on the detected one or more cables; and
   provide an indication of the improper connection using the electronic device.

14. The plurality of connected electronic devices of claim 13, wherein, in determining the type of the respective electronic device, the processor is further configured to:
   determine that the respective electronic device is the mid-unit electronic device in response to detection of a cable connected in the first port or a third port in a third wall of the well;
   determine that the electronic device is the master-unit electronic device in response to detection of a cable connecting a fourth port in the first wall of the well to and external audio source; and
   determine that the respective electronic device is the end-unit electronic device in response to determination that the respective electronic device is not configured as the master-unit electronic device or the mid-unit electronic device.

15. The plurality of connected electronic devices of claim 1, wherein the plurality of electronic devices is a plurality of speakerphones configured to
   output audio content received from the external audio source via connection of the first electronic device to the external audio source;
   receive audio input; and
   transmit the received audio input to the external audio source via the connection of the first electronic device to the external audio source.

16. A method of operating a plurality of connected electronic devices, the electronic devices including a housing having a first port in a first wall of a well defined in a bottom face of the housing, a second port in a first wall of the well, a third port in a third wall of the well, and a fourth port formed the first wall, the method including, for each of the connected electronic devices:
   detecting a first cable connected to the first port or the third port of the respective electronic device;
   determining that the respective electronic device is connected to another electronic device of the plurality of electronic devices in response to the detection of the first cable connected to the first port or the third port of the respective electronic device;
   determining a type of the respective electronic device in response to the determined connection of the respective electronic device to another electronic device, including:
      determining that the respective electronic device is a master-unit electronic device in response to detection of a second cable connected between the fourth port of the respective electronic device and an external audio source;
      determining that the respective electronic device is a mid-unit electronic device in response to detection of a third cable connected to the first port or the third port of the respective electronic device; and
      determining that the respective electronic device is an end-unit electronic device in response to detection that the respective electronic device is not configured as a master-unit electronic device or a mid-unit electronic device; and
   operating the respective electronic device in accordance with the determined type.

17. The method of claim 16, further comprising:
   detecting an improper cable connection in one of the first port, the second port, the third port or the fourth port; and
   outputting an indication of the detected improper connection, including at least one of outputting a visual indication by a light source of the respective electronic device or outputting an audible indication by an audio output device of the respective electronic device.

18. The method of claim 16, wherein the first port is configured to receive a connector of a first data link cable, the second port is configured to receive a connector of a power cable, the third port is configured to receive a connector of a second data link cable, and the fourth port is configured to receive a connector of a USB cable.

* * * * *